United States Patent
Tanaka

(10) Patent No.: US 9,571,208 B2
(45) Date of Patent: Feb. 14, 2017

(54) INPUT/OUTPUT DEVICE, MOBILE DEVICE, AND INFORMATION DISPLAYING DEVICE

(75) Inventor: Masahide Tanaka, Osaka (JP)

(73) Assignee: Rohm Co., Ltd., Kyoto (JP)

( * ) Notice: Subject to any disclaimer, the term of this patent is extended or adjusted under 35 U.S.C. 154(b) by 267 days.

(21) Appl. No.: 13/389,046

(22) PCT Filed: Aug. 10, 2010

(86) PCT No.: PCT/JP2010/063520
§ 371 (c)(1),
(2), (4) Date: Feb. 6, 2012

(87) PCT Pub. No.: WO2011/021531
PCT Pub. Date: Feb. 24, 2011

(65) Prior Publication Data
US 2012/0133605 A1     May 31, 2012

(30) Foreign Application Priority Data

Aug. 18, 2009   (JP) ................................. 2009-188845
Dec. 14, 2009   (JP) ................................. 2009-282781
Dec. 16, 2009   (JP) ................................. 2009-285678

(51) Int. Cl.
G06F 3/041      (2006.01)
H04B 13/00      (2006.01)
H04M 3/42       (2006.01)

(52) U.S. Cl.
CPC ........ *H04B 13/005* (2013.01); *H04M 3/42391* (2013.01)

(58) Field of Classification Search
CPC .................... H04B 13/005; H04M 3/42391

USPC .................................................... 345/173–179
See application file for complete search history.

(56) References Cited

U.S. PATENT DOCUMENTS

| | | | |
|---|---|---|---|
| 5,796,827 A * | 8/1998 | Coppersmith et al. | ....... 713/182 |
| 7,202,773 B1 | 4/2007 | Oba et al. | |
| 2002/0128030 A1 | 9/2002 | Eiden et al. | |
| 2004/0027385 A1 | 2/2004 | Rekimoto et al. | |
| 2006/0256700 A1 | 11/2006 | Ishibashi et al. | |
| 2007/0242613 A1 | 10/2007 | Shigetoshi | |
| 2008/0259043 A1 | 10/2008 | Buil et al. | |
| 2008/0294722 A1 | 11/2008 | Park et al. | |
| 2010/0004031 A1* | 1/2010 | Kim | ............... H04M 1/274525 455/566 |
| 2010/0060595 A1* | 3/2010 | Lee | ..................... H04M 1/2745 345/173 |
| 2010/0137027 A1* | 6/2010 | Kim | .................... G06F 3/03547 455/556.1 |

(Continued)

FOREIGN PATENT DOCUMENTS

| | | |
|---|---|---|
| CN | 1185065 | 6/1998 |
| JP | 7-170215 | 7/1995 |

(Continued)

*Primary Examiner* — Amare Mengistu
*Assistant Examiner* — Jennifer Zubajlo
(74) *Attorney, Agent, or Firm* — Fish & Richardson P.C.

(57) ABSTRACT

Provided is an input/output device, including: a touch unit that is touched by a human body; an information processing unit that performs information processing based on a touch made on the touch unit by the human body; and a human-body communication unit that performs human-body communication by using the human body touching the touch unit as a path.

7 Claims, 18 Drawing Sheets

(56) References Cited

U.S. PATENT DOCUMENTS

2010/0159996 A1* 6/2010 Rider .................. G06F 3/04886
  455/566
2010/0318420 A1 12/2010 Park et al.

FOREIGN PATENT DOCUMENTS

| | | |
|---|---|---|
| JP | 2001-195368 | 7/2001 |
| JP | 2002-208897 | 7/2002 |
| JP | 2002-222169 | 8/2002 |
| JP | 2002-244794 | 8/2002 |
| JP | 2002-261702 | 9/2002 |
| JP | 2004-282733 | 10/2004 |
| JP | 2006-271798 | 10/2006 |
| JP | 2006-279365 | 10/2006 |
| JP | 2007-058466 | 3/2007 |
| JP | 2007-288602 | 11/2007 |
| JP | 2008-092162 | 4/2008 |
| JP | 2008-537807 | 9/2008 |
| JP | 2009-99142 | 5/2009 |
| JP | 2009-518736 | 5/2009 |
| JP | 2009-223408 | 10/2009 |
| JP | 2010-511959 | 4/2010 |
| WO | 2008/069570 | 6/2008 |
| WO | WO 2008069570 A1 * | 6/2008 |
| WO | 2010-098050 | 9/2010 |
| WO | WO 2010098050 A1 * | 9/2010 |

\* cited by examiner

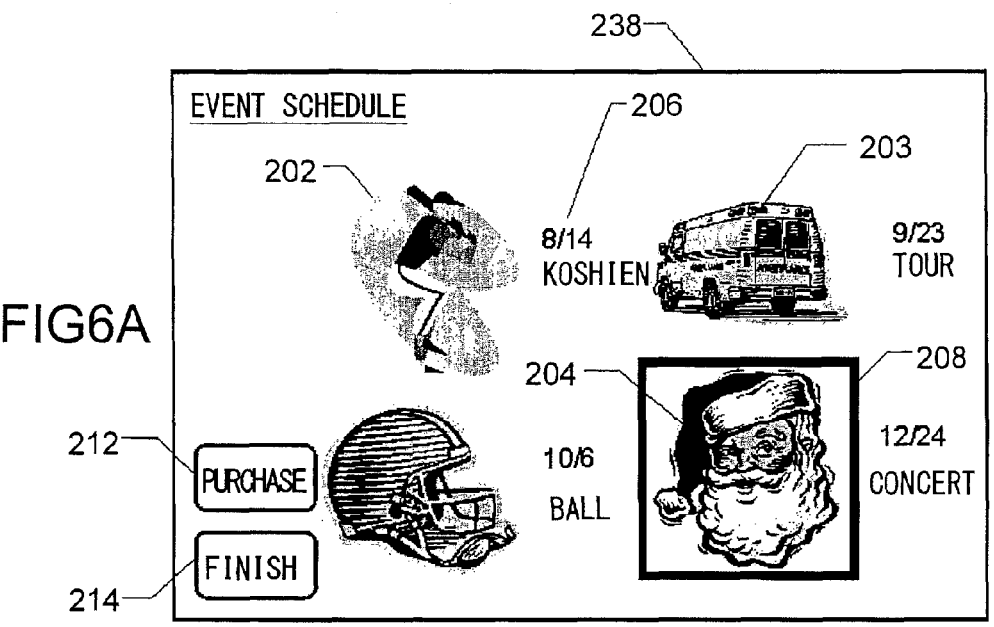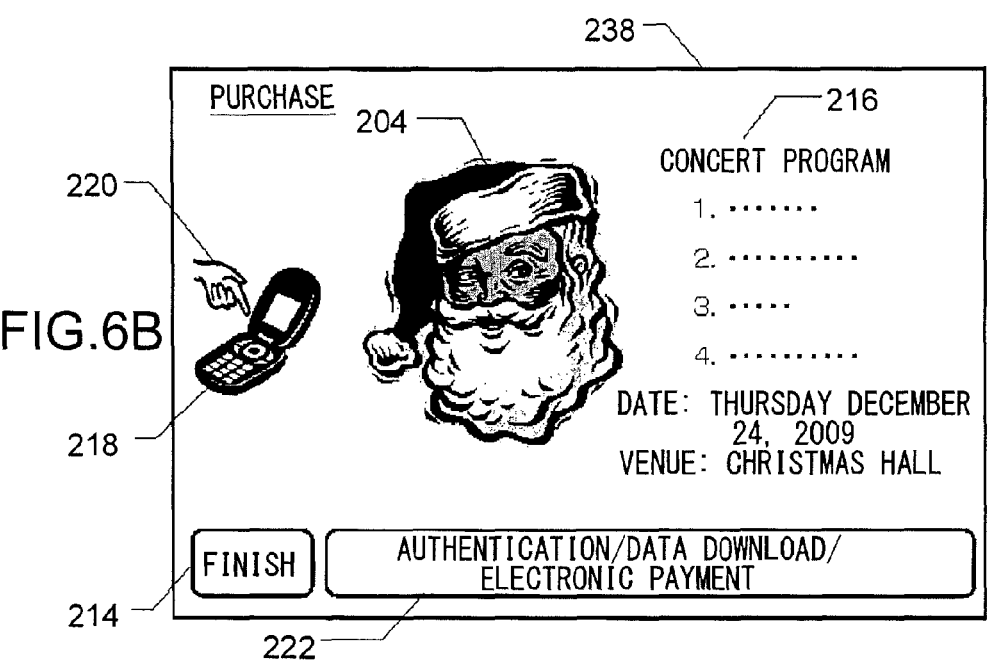

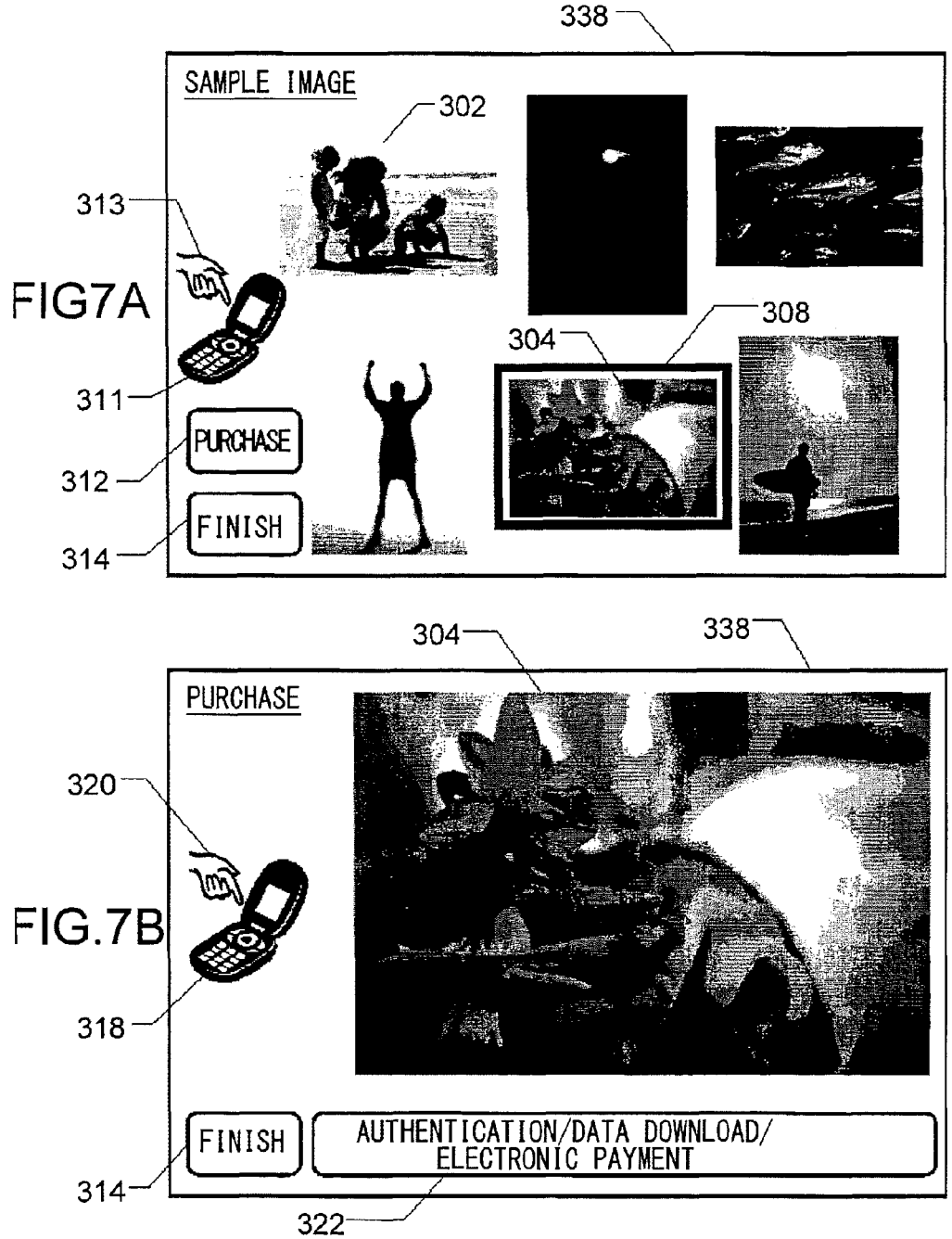

INPUT/OUTPUT DEVICE, MOBILE DEVICE, AND INFORMATION DISPLAYING DEVICE

TECHNICAL FIELD

The present invention relates to an input/output device, a mobile device, and an information displaying device.

BACKGROUND ART

With regard to information input performed on a mobile device or an information displaying apparatus, there are various proposals about, for example, a graphical user interface (GUI). Specific examples of an information input device includes a touch panel that allows image information to be output visually and an output image to be touched in order to input information. On the other hand, there are also various proposals about information transmitting means, and, for example, Patent Literature 1 and Patent Literature 2 propose human-body communication in which communication is performed through a human body.

CITATION LIST

Patent Literature

PTL 1: JP 2004-282733 A
PTL 2: JP 2006-271798 A

SUMMARY OF INVENTION

Technical Problem

However, there are still many various problems to be reviewed regarding provision of an input/output device that imposes a reduced load on a user and provision of a mobile device and an information displaying device that impose a reduced load on a user in terms of inputting and displaying of information.

In view of the above-mentioned problems, an object of the present invention is to provide an input/output device, a mobile device, and an information displaying device which are more user-friendly.

Solution to Problem

In order to solve the above-mentioned problems, an input/output device according to the present invention has a configuration (first configuration) including: a touch unit that is touched by a human body; an information processing unit that performs information processing based on a touch made on the touch unit by the human body; and a human-body communication unit that performs human-body communication by using the human body touching the touch unit as a path.

Note that, in the input/output device having the above-mentioned first configuration, the input/output device may have a configuration (second configuration) in which: the touch unit includes a display screen; the information processing unit includes: a detection unit that detects a touch position on the display screen as input information; and an output information providing unit that provides output information based on detection performed by the detection unit; and the human-body communication unit includes an information output unit that applies the output information provided by the output information providing unit to the display screen for the human-body communication.

Further, in the input/output device having the above-mentioned first configuration, the input/output device may have a configuration (third configuration) further including a storage unit that stores information based on a detection result obtained by the detection unit, in which the output information providing unit provides the output information based on the information stored in the storage unit.

Further, in the input/output device having the above-mentioned second configuration, the input/output device may have a configuration (fourth configuration) in which the information output unit applies the output information provided by the output information providing unit to the display screen for the human-body communication in response to touch position detection performed by the detection unit.

Further, in the input/output device having the above-mentioned fourth configuration, the input/output device may have a configuration (fifth configuration) in which the information output unit stops applying the output information when the touch position detection is no longer continued by the detection unit.

Further, in the input/output device having the above-mentioned first configuration, the input/output device may have a configuration (sixth configuration) in which: the touch unit includes a display screen; and the information processing unit includes: a receiving unit that receives display information to be displayed on the display screen; a detection unit that detects a touch position on the display screen; and a control unit that controls the detection unit in accordance with the display information received by the receiving unit.

Further, in the input/output device having the above-mentioned first configuration, the input/output device may have a configuration (seventh configuration) in which: the touch unit includes a biometric authentication unit for inputting authentication information from the human body; the information processing unit includes an output information providing unit that provides output information; and the human-body communication unit includes an information output unit that applies the output information provided by the output information providing unit to the biometric authentication unit for the human-body communication.

Further, in the input/output device having the above-mentioned first configuration, the input/output device may have a configuration (eighth configuration) in which: the touch unit includes a biometric authentication unit for inputting authentication information from the human body; the human-body communication unit includes a receiving unit that receives human-body communication information applied to the human-body communication unit when an authentication is performed by the biometric authentication unit; and the information processing unit includes a judgement unit that judges whether or not to output information from the human-body communication unit based on an authentication result obtained from the biometric authentication unit and the human-body communication information obtained from the receiving unit.

Further, in the input/output device having the above-mentioned second configuration, the input/output device may have a configuration (ninth configuration) in which a combination of the input information and the output information is any one of: designation information on a music track and music track data; designation information on an event and event admission ticket data; designation information on an image and image data; designation information on a passenger ticket and passenger ticket data; transaction information to be submitted to a banking facility and transaction settlement result data obtained from the banking facility; and home shopping product designation information and communication destination determination information.

A mobile device according to the present invention has a configuration (tenth configuration) including human-body communication means for inputting output information output from the input/output device having the above-mentioned second configuration by human-body communication.

Note that, in the mobile device having the above-mentioned tenth configuration, the mobile device may have a configuration (eleventh configuration) in which: information input from the input/output device by the human-body communication means includes communication destination determination information; and the mobile device further includes: a storage unit that stores the communication destination determination information; and communication means for performing communication based on the communication destination determination information stored in the storage unit.

A mobile device according to the present invention has a configuration (twelfth configuration) including: communication means; a storage unit that stores communication destination determination information for determining a communication destination used by the communication means; and human-body communication means for inputting the communication destination determination information.

Note that, in the mobile device having the above-mentioned twelfth configuration, the mobile device may have a configuration (thirteenth configuration) in which a combination of the communication means and the communication destination determination information is at least one of: the Internet and a uniform resource locator (URL); and a telephone line and a telephone number.

An information displaying device according to the present invention has a configuration (fourteenth configuration) including: a display screen; a receiving unit that receives display information to be displayed on the display screen; a detection unit that detects a touch position on the display screen; and a control unit that controls the detection unit in accordance with the display information received by the receiving unit.

Note that, in the information displaying device having the above-mentioned fourteenth configuration, the information displaying device may have a configuration (fifteenth configuration) in which the control unit controls whether or not touch position detection by the detection unit is possible depending on the received display information.

Further, in the input/output device having the above-mentioned first configuration, the input/output device may have a configuration (sixteenth configuration) in which: the touch unit includes a display screen; and the human-body communication unit is provided to the display screen, and includes: a timer unit; and a control unit that controls the human-body communication unit depending on a time measured by the timer unit.

Further, in the input/output device having the above-mentioned first configuration, the input/output device may have a configuration (seventeenth configuration) in which: the touch unit includes a display screen; the human-body communication unit is provided to the display screen; and the information processing unit includes: a detection unit that detects a touch position on the display screen; a storage unit including a plurality of information storage positions; and a control unit that inputs information to be transmitted to one of the plurality of information storage positions within the storage unit designated based on detection performed by the detection unit via the human-body communication unit.

Further, in the input/output device having the above-mentioned first configuration, the input/output device may have a configuration (eighteenth configuration) in which the human-body communication unit includes: a first human-body communication unit; a second human-body communication unit provided in a place different from the first human-body communication unit; a storage unit; and a control unit that applies at least one of the first human-body communication unit and the second human-body communication unit with output information for transmitting information stored in the storage unit to an external portion.

Further, in the input/output device having the above-mentioned first configuration, the input/output device may have a configuration (nineteenth configuration) in which: the touch unit includes a display screen; and the information processing unit includes: a detection unit that detects a touch position on the display screen; a storage unit that stores a plurality of information items that are selectable; and a control unit that retains selection memory obtained by selecting at least one of the plurality of information items stored in the storage unit based on detection performed by the detection unit, and applies the human-body communication unit with output information for transmitting information selected based on the selection memory from the storage unit to an external portion.

Further, in the input/output device having the above-mentioned nineteenth configuration, the input/output device may have a configuration (twentieth configuration) in which the control unit erases the selection memory upon completion of information transmission to the external portion performed by the human-body communication unit.

Advantageous Effects of Invention

According to the present invention, it is possible to provide an input/output device, a mobile device, and an information displaying device which are more user-friendly.

BRIEF DESCRIPTION OF DRAWINGS

FIG. 6 Display screen diagrams illustrating display of a touch panel according to a second embodiment of the present invention. (second embodiment)

FIG. 7 Display screen diagrams illustrating display of a touch panel according to a third embodiment of the present invention. (third embodiment)

DESCRIPTION OF EMBODIMENTS

First Embodiment

Figure 1:
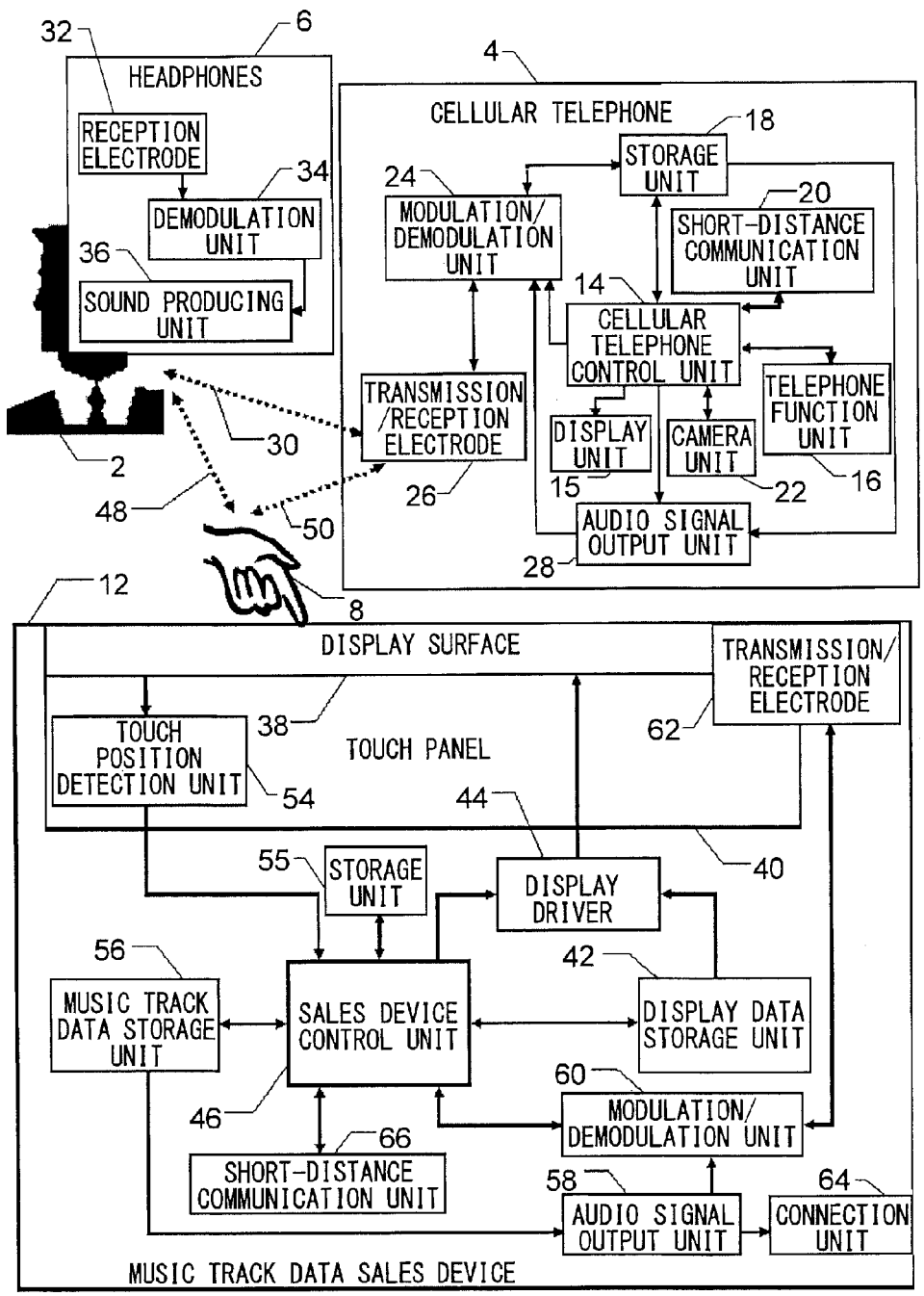
FIG. 1 A block diagram according to a first embodiment of the present invention. (first embodiment)

FIG. 1 is a block diagram illustrating a first embodiment of an information input/output device according to an embodiment mode of the present invention. The first embodiment constitutes a system including a cellular telephone 4 held by a user 2, user-owned headphones 6 mounted to a head portion of the user 2, and a music track data sales device 12 including a touch panel 40 that is touched by a finger 8 of the user 2. The first embodiment is structured by such a system structure as described above so that an audio signal of a music track designated by being touched by the finger 8 of the user 2 can be conveyed to the headphones 6 by human-body communication utilizing a body of the user 2 and that music track data designated by being touched by the finger 8 of the user 2 can be downloaded to the cellular telephone 4 by the human-body communication utilizing the body of the user 2.

The cellular telephone 4 includes a cellular telephone control unit 14 made up of a computer that controls an entirety of the cellular telephone 4, and controls a telephone function unit 16 and the like in accordance with operations with respect to the cellular telephone 4. The telephone function unit 16 is a part related to a normal telephone function, and includes a communication function unit as well as a voice processing unit, a telephone transmitter, and a telephone receiver. The cellular telephone control unit 14 has functions executed by software stored in a storage unit 18. The storage unit 18 also temporarily stores various kinds of data necessary to control the entirety of the cellular telephone 4, and serves as a storage device for information to be accumulated/retained on the cellular telephone 4 such as address book data. The storage unit 18 further serves as a storage device for the music track data downloaded from the music track data sales device 12. In order to realize such functions as described above, the storage unit 18 includes a nonvolatile memory unit made up of a hard disk or the like and a volatile memory unit made up of a semiconductor memory or the like.

The cellular telephone control unit 14 further controls a display unit 15 of the cellular telephone 4, and causes the display unit 15 to display a GUI in cooperation with the operations with respect to the cellular telephone 4 and to display control results. The display unit 15 may be structured as a touch panel and may serve as an operation unit of the GUI. The cellular telephone control unit 14 controls a sound producing unit (not shown) provided separately from the telephone receiver of the telephone function unit 16 to generate a notification sound and an alert sound regarding various functions of the cellular telephone 4 also in coordination with the display unit 15 and serve as a speaker of the cellular telephone 4 used in a video telephone mode or the like. The cellular telephone 4 also includes a GPS unit (not shown) to obtain information on a latitude, a longitude, and an altitude, which is absolute position information on the cellular telephone 4, from a satellite or a nearest broadcast station based on a GPS system and send the information to the cellular telephone control unit 14. The absolute position information is displayed on the display unit 15 along with a map under control of the cellular telephone control unit 14 and provided as navigation information.

The cellular telephone 4 is allowed to perform wireless communication via a telephone line including a normal telephone conversation by the telephone function unit 16. In addition thereto, the cellular telephone 4 includes a short-distance communication unit 20 using a wireless LAN, a Bluetooth®, a weak radio-wave, or the like, and can perform the wireless communication to/from another cellular telephone, a station wicket, and the like existing within a range of short-distance communication. The cellular short-distance communication unit 20 is based on the standards abiding by regulations, and involves no charge unlike the telephone line although communication coverage is limited. In this manner, the cellular telephone 4 can communicate to/from another cellular telephone through infrastructure communication via a base station of a communication line, and is allowed to perform direct ad-hoc communication to/from another cellular telephone, a station wicket, and the like by the short-distance communication unit 20.

Further, the cellular telephone 4 includes a camera unit 22, and can store a photographed image in the storage unit 18 and can transmit the image to another cellular telephone by using the telephone function unit 16. Note that, the cellular telephone 4 is supplied with power by a rechargeable main power source (not shown), and the storage unit 18 is further backed up by an auxiliary power source (not shown) made up of a lithium battery or the like. This prevents information stored in the volatile memory unit of the storage unit 18 from being volatilized in a case of discharging or replacing the main power source.

The cellular telephone 4 further includes a modulation/demodulation unit 24 and a transmission/reception electrode 26 that collaborates therewith. The transmission/reception electrode 26 is provided in a position near a human body surface, such as an external wall of the cellular telephone 4. The modulation/demodulation unit 24 and the transmission/reception electrode 26 constitute a human-body communication system disclosed in, for example, Patent Literature 1 and Patent Literature 2 as described above, and perform communication by using the human body as a medium. For example, when the music track data or the like stored in the storage unit 18 is converted into an audio signal and output by an audio signal output unit 28 under control of the cellular telephone control unit 14, the audio signal is modulated into a transmission signal having a user-specific frequency by the modulation/demodulation unit 24, and the transmission signal is applied to the human body of the user 2 holding the cellular telephone 4 from the transmission/reception electrode 26 as indicated by an arrow 30. The cellular telephone 4 may not only be held by the hand of the user 2 but also be received in a place, such as a pocket of clothes, in close proximity to the human body surface of the user 2.

When the transmission signal is applied to the human body of the user 2 in the above-mentioned manner, an electrostatic magnetic field, an induction field, or a quasi-electrostatic field (hereinafter, referred to generically as "human body surface field") exhibiting an intensity corresponding to the transmission signal is induced around the human body of the user 2. The transmission signal that propagates through the human body surface field is received by a reception electrode 32 of the headphones 6 and demodulated into an audio signal by a demodulation unit 34 to thereby be delivered as the music track from a sound producing unit 36 to an ear of the user 2. By the human-body communication as described above, it is possible to cause the headphones 6 to emit a sound in accordance with the audio signal from the cellular telephone 4 in a cordless manner. Note that, in this case, the frequency of the transmission signal is user-specific, which prevents leakage of information even if an external portion for which the same frequency is not set comes in contact with the human body of the user 2.

Next, description is made of details of the music track data sales device 12 that provides data to be downloaded onto the cellular telephone 4 and the audio signal for causing the headphones 6 to emit the sound. To participate in this system, the frequency of the transmission signal for the human-body communication within the headphones 6 of the user 2 needs to be set to a publicly-announced frequency for trial-listening on the music track data sales device 12. The music track data sales device 12 is installed in an audio shop or the like, and is provided with the touch panel 40 including a display surface 38 for displaying a table or a list of a large number of music tracks in order to allow the user 2 to make a selection. Data for the display is stored in a display data storage unit 42, and a display driver 44 is controlled by a sales device control unit 46 to perform the above-mentioned display based on the data. The user 2 uses his/her finger 8 to touch an indication of a desired music track title or cover art image displayed on the display surface 38. With this operation, in a case of trial-listening, the audio signal from the music track data sales device 12 is transmitted to the reception electrode 32 as indicated by an arrow 48 by the human-body communication through the touching finger 8 and causes the headphones 6 to emit the sound. Further, in purchase of the music track, as indicated by an arrow 50 by the human-body communication through the touching finger 8, the music track data from the music track data sales device 12 is transmitted to the transmission/reception electrode 26 and downloaded onto the storage unit 18 of the cellular telephone 4.

First, specific description is made of the case of trial-listening. When the finger 8 of the user 2 touches the indication of the desired one of music track titles and cover art images displayed on the display surface 38, a signal thereof is detected by a touch position detection unit 54, and based on processing for the result, the sales device control unit 46 recognizes the music track touched by the finger 8. Note that, the recognized music track is stored in a storage unit 55. In response to the recognition of the music track, the display driver 44 controls the display of the display surface 38 to visually inform the user 2 that the music track has been recognized by displaying a selection cursor around the touched indication of the music title or cover art image. Note that, an acknowledgment with respect to the user 2 may be made by causing the cover art image to blink or changing its color instead of using the selection cursor.

At the same time as the displaying of the selection, the sales device control unit 46 calls the acknowledged music track from a music track data storage unit 56, and causes the music track to be converted into the audio signal and output by an audio signal output unit 58. When the audio signal is output, a modulation/demodulation unit 60 modulates the audio signal into the transmission signal having the publicly-announced frequency for trial-listening, and applies the transmission signal to a front surface of the display surface 38 from a transmission/reception electrode 62. The applied transmission signal is transmitted to the reception electrode 32 of the headphones 6 by the human-body communication indicated by the arrow 48 through the finger of the user 2 touching the display surface 38. The transmission signal is demodulated by the demodulation unit 34 and emitted as a sound from the sound producing unit 36, which allows the user 2 to trial-listen the music track selected by the finger 8 on the touch panel 40. Note that, to continue the trial-listening, it is necessary to keep the finger 8 in contact with the display surface 38 of the touch panel 40. When the finger 8 is released, the touch position detection unit 54 senses the release, and the sales device control unit 46 cancels the trial-listening and stops outputting the audio signal from the audio signal output unit 58. Note that, the audio signal is stopped being output, but the selection result of the music track is stored in the storage unit 55, and hence selection display thereof is continued even if the finger 8 is released as long as the selection is kept from being canceled.

On the other hand, in the purchase of the music track, the frequency of the transmission signal for the human-body communication on the cellular telephone 4 needs to be set to a frequency dedicated to the purchase which is publicly announced by the music track data sales device 12. This frequency is different from the above-mentioned frequency for trial-listening. Then, under such conditions, when the finger 8 of the user 2 touches a button that gives an instruction for the purchase of the selected music track displayed on the display surface 38, a signal thereof is detected by the touch position detection unit 54, the sales device control unit 46 calls the music track data on the music track whose purchase has been confirmed from the music track data storage unit 56. The called music track data is modulated into the transmission signal having a frequency dedicated to the purchase of the above-mentioned data by the modulation/demodulation unit 60 and is applied from the transmission/reception electrode 62 to the front surface of the display surface 38. The applied transmission signal is transmitted to the transmission/reception electrode 26 of the cellular telephone 4 by the human-body communication indicated by the arrow 50 through the finger of the user 2 touching the display surface 38. The transmission signal is demodulated by the modulation/demodulation unit 24 and stored in the storage unit 18. Note that, in accordance therewith, payment processing for the purchase is performed by using the same human-body communication path. When all process is completed, the display is performed to that effect, which may be confirmed before releasing the finger 8. Note that, the music track data is compressed data, and hence the time for keeping the finger 8 in contact is remarkably shorter than in the case of trial-listening. Further, the frequency of the transmission signal for the data communication is different from the above-mentioned frequency for trial-listening, which prevents an unpleasant sensation of hearing the data communication signal from the headphones 6.

The music track data sales device 12 further includes trial-listening and music track sales means for the user who has no human-body communication means. Specifically, the audio signal output unit 58 also outputs the audio signal to a connection unit 64, and even the user who has no human-body communication means can perform the trial-listening by connecting a normal wired headphones to the connection unit 64. At this time, the operation or the like with respect to the touch panel 40 is common to the case of the human-body communication. Further, in the purchase of the music track, the music track data sales device 12 can also output the music track data from a short-distance communication unit 66. The music track data output from the short-distance communication unit 66 can be communicated to the short-distance communication unit 20 of the cellular telephone 4 to thereby allow a transfer of the music track data and a purchase payment therefor. In the case of the purchase, the operation or the like with respect to the touch panel 40 is basically common to the case of the human-body communication, but an operation for starting the short-distance communication is necessary.

Figure 2A:
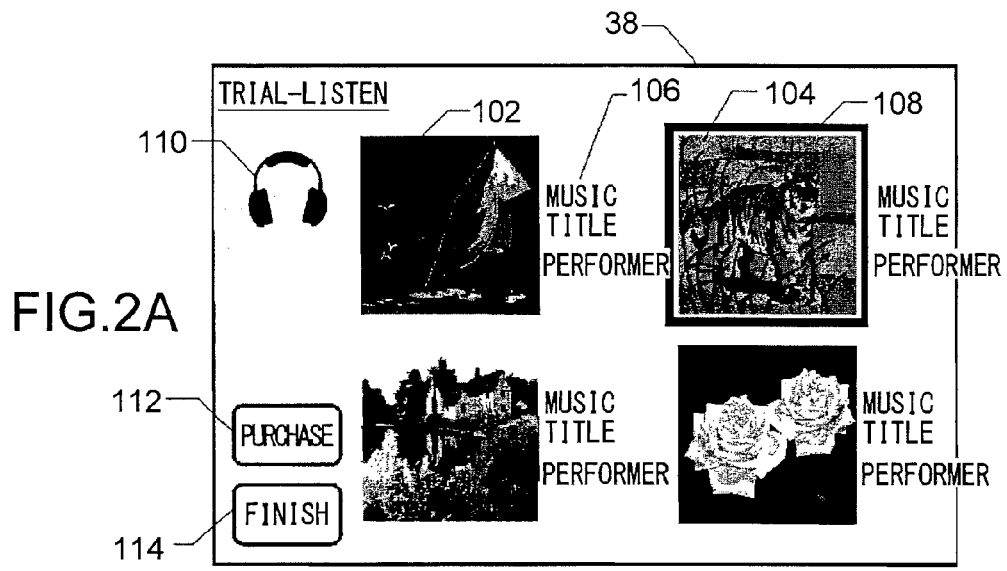
FIG. 2 Display screen diagrams illustrating display of a touch panel according to the first embodiment.

FIG. 2 are display screen diagrams illustrating display of the display surface 38 of the touch panel of the music track data sales device 12 according to the first embodiment. Description thereof is made by referring to the reference numerals of FIG. 1 as appropriate. FIG. 2(A) illustrates a screen for trial-listening in which cover art images 102 and 104 and the like of music tracks are displayed along with comments 106 such as music titles and performers. The user 2 can select the music track by touching any one of the cover art images by using the finger 8. FIG. 2(A) indicates a state in which the finger 8 of the user 2 is touching the cover art image 104, which is detected by the function of the touch position detection unit 54 of the touch panel 40, and a selection cursor 108 is displayed around the cover art image 104 to notify the user 2 that the selection of the music track has been recognized by the touch panel 40.

On the other hand, a headphone icon 110 is displayed when the headphones 6 are in a human-body communication state through the finger 8 of the user 2 with the headphones 6 responding in accordance with a human-body communication protocol. This allows the user 2 to know that the human-body communication is enabled. Further, while the headphone icon 110 is displayed, the audio signal of the music track for trial-listening corresponding to the selected cover art display 104 is sent to the headphones 6 by the human-body communication, and hence the user 2 can listen thereto by the headphones 6.

Figure 2B:
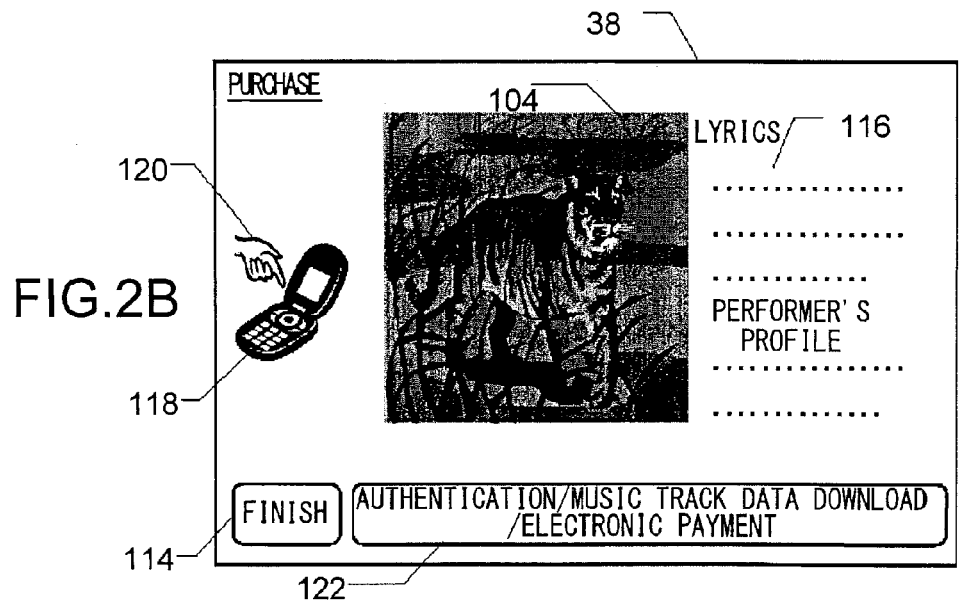

Note that, once a music track selection is recognized by the music track data sales device 12, the trial-listening to the music track is continued even if the finger 8 is displaced from the cover art image 104 as long as the finger 8 continues touching on the display surface 38. In contrast thereto, when the user 2 releases the finger 8 from the display surface 38, the touch panel 40 detects the release and stops the trial-listening to the music track. At the same time, the display of the headphone icon 110 disappears as well. Incidentally, when the finger 8 is released from the display surface 38, the path for the human-body communication itself is disconnected as well. On the other hand, even if the finger 8 is released from the display surface 38, the fact that the music track corresponding to the cover art display 104 was selected is stored/retained by the storage unit 55 of the music track data sales device 12, and the display of the music track selection cursor 108 is also continued. When the finger 8 of the user 2 touches a purchase button 112 in this state, purchase processing for the selected music track is started, and a screen for purchase of FIG. 2(B) is displayed. On the other hand, when the finger 8 of the user 2 touches a finish button 114, the memory within the storage unit 55 storing the selected music track is cleared, and the display of the music track selection cursor 108 disappears as well.

In FIG. 2(B), the cover art image 104 corresponding to the selected music track is enlarged/displayed, and detailed comments 116 such as lyrics and the performer's profile are displayed. In this state, the frequency of the transmission signal for the human-body communication is set to the frequency dedicated to the purchase. When an authentication/download/payment button 122 is touched on the screen of FIG. 2(B), a human-body communication path is formed between the music track data sales device 12 and the cellular telephone 4 through the finger 8, and a cellular telephone icon 118 and a human-body communication icon 120 are displayed when there is a response from the cellular telephone 4 in accordance with the human-body communication protocol. At the same time, the touch position detection unit 54 detects the touch on the authentication/download/payment button 122, and performs a series of processing from an authentication of the cellular telephone 4, through a transmission of the music track data from the music track data sales device 12 to the cellular telephone 4, to electronic payment processing related to a fee payment between the music track data sales device 12 and the cellular telephone 4.

Note that, also in the state of FIG. 2(B), when the finish button 114 is touched instead of touching the authentication/download/payment button 122, the processing is canceled without starting the purchase of the music track. Further, as already described, the music track data sales device 12 is allowed to perform a music track sales transaction with the cellular telephone 4 by the short-distance communication unit 66 as well, but when a response is thus received from the cellular telephone 4 by a short-distance communication protocol instead of the human-body communication, only the cellular telephone icon 118 is displayed, while the human-body communication icon 120 is caused to disappear. The above-mentioned functions of the trial-listening to and the purchase of the music track as described above are further described in detail with reference to the following flowchart.

Figure 3:
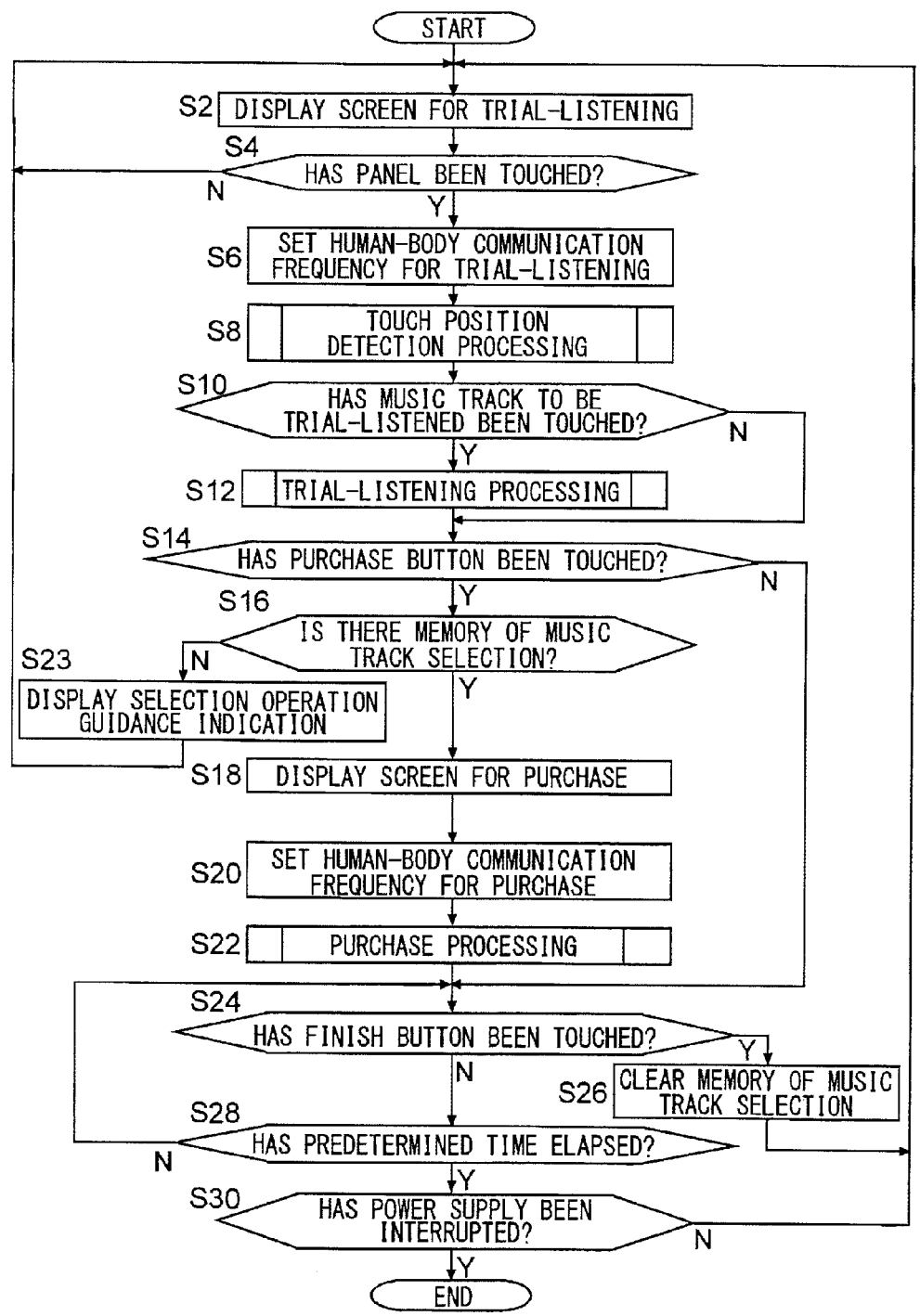
FIG. 3 A flowchart illustrating a function of a sales device control unit according to the first embodiment.

FIG. 3 is a flowchart illustrating a function of the sales device control unit 46 according to the first embodiment of FIG. 1. A flow starts by supplying power to the music track data sales device 12. When the flow starts, in Step S2, an instruction is given to display the screen for trial-listening. As a result thereof, the display as illustrated in FIG. 2(A) is performed on the display surface 38. Note that, the selection cursor 108 or the headphone icon 110 illustrated in FIG. 2(A) is not displayed in this stage yet. Subsequently, in Step S4, it is verified whether or not there is a touch on the touch panel 40, and if a touch is not detected, a touch is waited by repeating Steps S2 and S4.

If a touch is detected in Step S4, the flow advances to Step S6, in which a human-body communication frequency for trial-listening is automatically set. The human-body communication frequency for trial-listening is automatically set on a side of the headphones 6 at all times. Subsequently, touch position detection processing is performed in Step S8, and if a touch position is identified, the flow advances to Step S10 to verify whether or not a selection part of the music track to be trial-listened has been touched. Specifically, this corresponds to the detection of the fact that the finger 8 has touched any one of the cover art images 102 and 104 and the like of the music track of FIG. 2(A). If a touch for trial-listening the music track is detected in Step S10, the flow advances to Step S12 to start the trial-listening processing for the selected music track, and when the trial-listening processing is completed, the flow advances to Step S14. The trial-listening processing of Step S12 is described later in detail. Note that, as described below, when the touch for trial-listening the music track is detected in Step S10, the selection cursor 108 as illustrated in FIG. 2(A) is displayed around the touched cover art image 104 of the music track during the trial-listening processing (Step S12), and the selection result of the music track is stored in the storage unit 55. On the other hand, if the touch for trial-listening the music track is not detected in Step S10, the flow advances directly to Step S14.

In Step S14, it is verified whether or not the purchase button 112 has been touched, and if a purchase button touch is detected, the flow advances to Step S16 to verify whether or not memory of the music track selection exists in the storage unit 55. If the memory exists, the flow advances to Step S18 to give an instruction to display the screen for purchase. As a result thereof, the screen for purchase as illustrated in FIG. 2(B) is displayed. Note that, the cellular telephone icon 118 or the human-body communication icon 120 illustrated in FIG. 2(B) is not displayed in this stage yet.

In addition, in Step S20, a human-body communication frequency for purchase is automatically set. If the human-body communication frequency for trial-listening is publicly-announced and if a human-body communication mode is activated on the cellular telephone 4, the human-body communication frequency for trial-listening is automatically set also on the cellular telephone 4 side. Subsequently, the purchase processing of Step S22 is started, and when the purchase processing is completed, the flow advances to Step S24. The purchase processing performed in Step S22 is described later in detail. Note that, if the purchase button touch is not detected in Step S14, the flow advances directly to Step S24.

On the other hand, if the memory of the music track selection is not detected in Step S16, the flow advances to Step S23 to give an instruction to display a guidance indication that prompts a music track selection operation, and the flow returns to Step S2. The guidance indication automatically disappears in a predetermined time. In other words, when the purchase button 112 is touched without touching any one of the indications of the cover arts of the music tracks in FIG. 2(A), a trial-listening screen of FIG. 2(A) is maintained without transitioning to a purchase screen of FIG. 2(B).

In Step S24, it is verified whether or not the finish button 114 has been touched, and if a finish button touch is detected, the flow advances to Step S26 to clear the memory of the music track selection from the storage unit 55 before returning to Step S2. The instruction to display the screen for trial-listening is given in Step S2, and hence in the case where the screen for purchase of FIG. 2(B) is being displayed, the display returns to the screen for trial-listening of FIG. 2(A). In other words, the finish button 114 in the state in which the screen for trial-listening is being displayed as illustrated in FIG. 2(A) functions as a cancel button for the music track selection, while the finish button 114 in the state in which the screen for purchase is being displayed as illustrated in FIG. 2(B) functions as a recovery button to the trial-listening screen.

On the other hand, if the finish button touch is not detected in Step S24, the flow advances to Step S28 to verify whether or not a predetermined time has elapsed since the touch on the panel was detected in Step S4. The case of advancing to Step S28 corresponds to a case where the finger 8 touches a position outside a predetermined position on the display surface 38 of the touch panel 40. In such a case, the touch panel 40 does not react, but the transmission signal for the human-body communication is being applied from the transmission/reception electrode 62 to the entirety of the display surface 38, thereby resulting in a state in which the human-body communication itself is enabled wherever the finger 8 is touching the display surface 38.

If the lapse of the predetermined time is not detected in Step S28, the flow returns to Step S24 to repeat Step S24 and Step S28, during which the flow advances to Step S26 if the finish button touch is detected. On the other hand, if the predetermined time has elapsed without the detection of the finish button touch, the flow advances to Step S30 to verify whether or not the power supply has been interrupted. Then, the flow returns to Step S2 if the power supply is continued. Thus, as long as the power supply is continued, Step S2 to Step S30 are repeated so as to handle the various situations.

Note that, when the flow returns to Step S2 by the finish button touch as described above, the memory of the music track selection within the storage unit 55 is cleared, but when the flow returns to Step S2 due to the lapse of the predetermined time, a state in which the music track is selected is maintained. Accordingly, when the trial-listening screen of FIG. 2(A) is automatically recovered without touching the finish button 114, another transition can be made to the purchase screen of FIG. 2(B) by touching the purchase button 112 again. On the other hand, if it is detected in Step S30 that the power supply has been interrupted, the flow is finished. Note that, in order to perform predetermined finishing processing after the power supply is interrupted, the music track data sales device 12 is provided with a capacitor for accumulating power that guarantees an operation for at least the predetermined time of Step S28.

Figure 4:
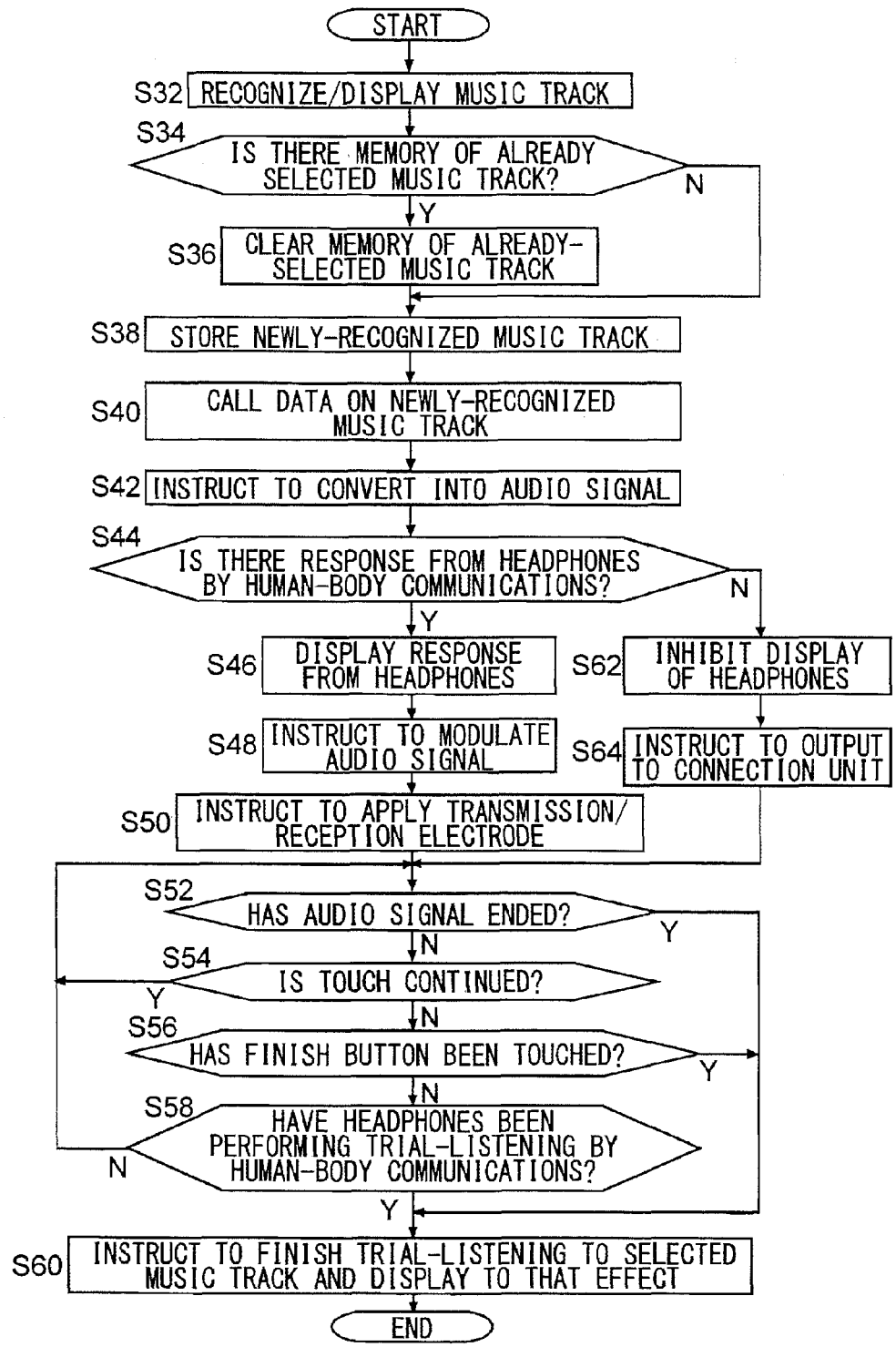
FIG. 4 A flowchart illustrating details of Step S12 of FIG. 3.

FIG. 4 is a flowchart illustrating details of the trial-listening processing performed in Step S12 of FIG. 3. When the flow starts, first in Step S32, the music track corresponding to the detected touch position is recognized, and the selection cursor 108 is displayed around the cover art display 104 of the recognized music track. Subsequently, it is verified in Step S34 whether or not memory of the already-selected music track is retained in the storage unit 55, and if the memory exists, the flow advances to Step S36 to erase the memory and advances to Step S38. On the other hand, if the memory of the already-selected music track is not detected in Step S34, the flow advances directly to Step S38.

In Step S38, a music track newly recognized by the current touch is stored in the storage unit 55, and data on the newly-recognized music track is called in Step S40. In addition, the flow advances to Step S42 to give an instruction to convert the called data into the audio signal. Then, it is verified in Step S44 whether or not there is a response in accordance with the human-body communication protocol from the headphones 6. If there is a response, the display is performed to that effect in Step S46. Therefore, the headphone icon 110 of FIG. 2(A) is displayed.

When the human-body communication is thus established between the music track data sales device 12 and the headphones 6, an instruction to modulate the audio signal into the transmission signal for the human-body communication is issued in Step S48, and the modulated audio signal is applied to the transmission/reception electrode 62 in accordance with an instruction issued in Step S50. After the above-mentioned processings, it is verified in Step S52 whether or not the selected music track for trial-listening has ended and the output of the audio signal has been finished. If not finished, it is verified in Step S54 whether or not the touch on the touch panel 40 is continued. As a result thereof, if the continued touch is detected, the flow returns to Step S52 to repeat Step S52 and Step S54 after that unless the audio signal ends or the finger 8 is released from the display surface 38.

If the continued touch is no longer detected in Step S54, the flow advances to Step S56 to verify whether or not the finish button 114 has been touched. If there is no touch on the finish button 114, the flow advances to Step S58 to verify whether or not the headphones 6 have been performing the trial-listening by the human-body communication. In the case of the trial-listening performed by the human-body communication, the flow advances to Step S60 to give an instruction to finish the trial-listening to the selected music track and display to that effect, and is finished. The display is performed by, for example, causing the indication of the purchase button 112 of FIG. 2(A) to blink in order to suggest the next operation. In this manner, in the case of the trial-listening to the music track performed by the human-body communication, even if the audio signal is midway through the music track and has not ended, the release of the finger 8, which is detected in Step S54, causes the flow to proceed to Step S60 to finish the trial-listening to the music track.

On the other hand, if it is not detected in Step S58 that the trial-listening has been being performed by the human-body communication, which means the trial-listening performed by connecting the headphones to the connection unit 64 in a wired manner, the flow returns to Step S52 even when the finger 6 is released from the touch panel 40, to continue the trial-listening to the music track selected by the touch as long as the audio signal continues. Note that, irrespective of whether or not the human-body communication is used, the flow advances to Step S60 immediately when the end of the audio signal is detected in Step S52 or when the touch on the finish button 114 is detected in Step S56.

Further, if there is no human-body communication response from the headphones 6 in Step S44, the flow advances to Step S62 to inhibit the headphone icon 110 from being displayed. Then, an instruction is further given in Step S64 to output the audio to the connection unit 64, and the flow proceeds to Step S52. This processing is performed to support the trial-listening that connects the headphones to the connection unit 64 in a wired manner. In this case, as described above, once the music track is recognized by the touch made by the finger 8, the finger 8 does not have to continue touching, and the trial-listening with the wired headphones can be continued unless the audio signal ends or the finish button 114 is touched.

Figure 5:
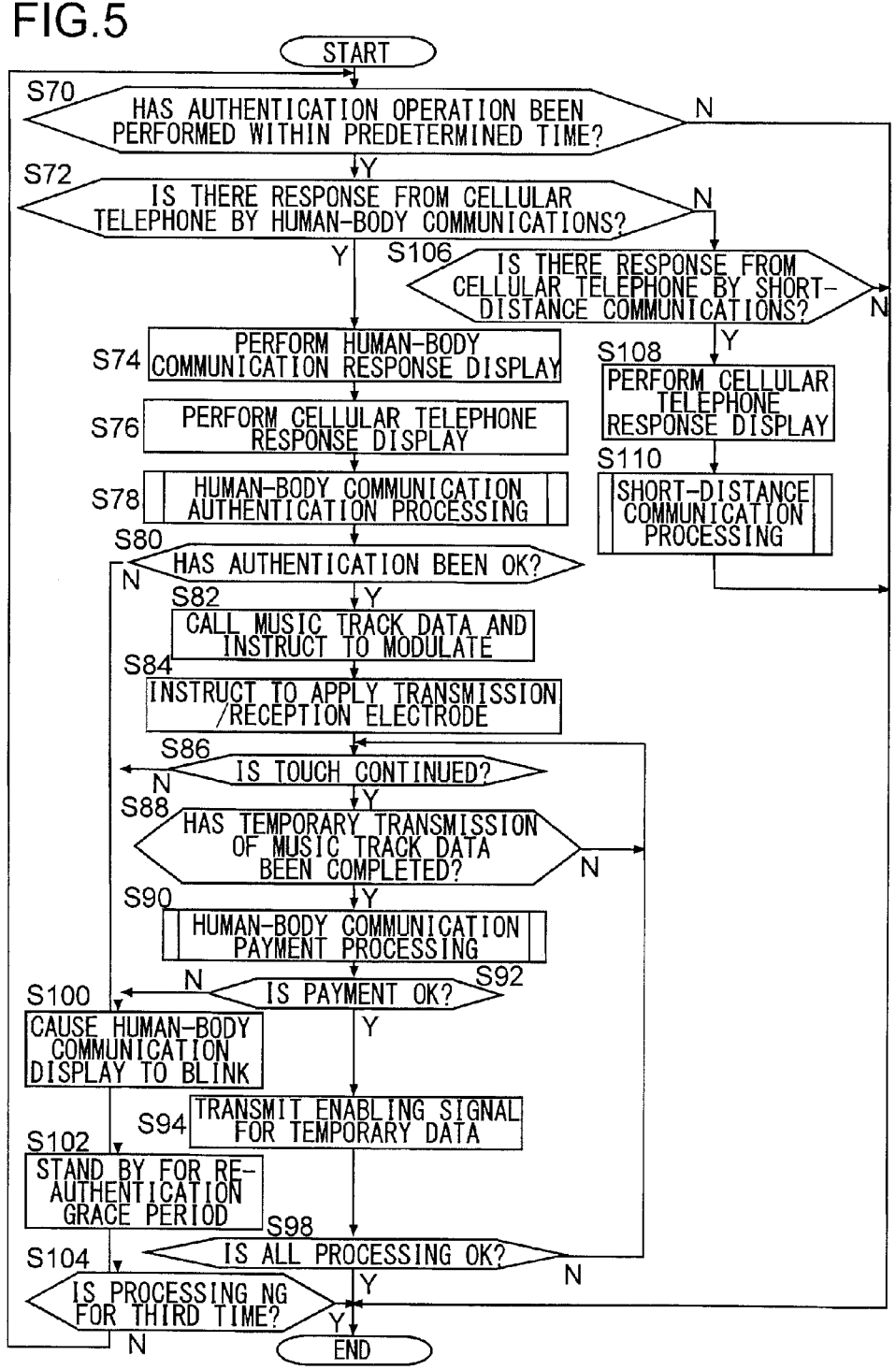
FIG. 5 A flowchart illustrating details of Step S22 of FIG. 3.

FIG. 5 is a flowchart illustrating details of the purchase processing performed in Step S22 of FIG. 3. When the flow starts, first in Step S70, it is verified whether or not an authentication operation has been performed within a predetermined time since the purchase screen of FIG. 2(B) was displayed. If the operation within the predetermined time is not detected, the flow is immediately finished and advances to Step S24 of FIG. 3. With this processing, as already described, if the authentication/download/payment button 122 is not touched within the predetermined time since the purchase screen of FIG. 2(B) was displayed, the flow returns to the trial-listening screen of FIG. 2(A) with the selection memory maintained or cleared. Naturally, the selection memory is maintained in the case where it is detected in Step S28 that the predetermined time has further elapsed, while the selection memory is cleared in the case where the finish button touch is detected in Step S24.

In contrast thereto, if the authentication operation is detected within the predetermined time in Step S70, the flow advances to Step S72. The detection of the authentication operation means the detection of the touch on the authentication/download/payment button 122 as described above. In Step S72, it is verified whether or not there is a response in accordance with the human-body communication protocol from the cellular telephone 4 through the touching finger 8. In the stage of Step S72, the human-body communication frequency for purchase has already been set in Step S20 of FIG. 3, and the music track data sales device 12 is ready to perform the human-body communication with the cellular telephone 4. If the response from the cellular telephone 4 is detected in Step S72, and when the human-body communication is established between the music track data sales device 12 and the cellular telephone 4, the flow advances to Step S74 to perform human-body communication response display and to Step S76 to perform cellular telephone response display. Those correspond to displaying the human-body communication icon 120 and the cellular telephone icon 118, respectively, in FIG. 2(B).

Subsequently, in Step S78, authentication processing is performed as to whether or not a transaction may be performed by using the human-body communication. This corresponds to authentication work for an ID and a password that are previously agreed upon in a contract between a dealer that manages the music track data sales device 12 and the user 2 who owns the cellular telephone 4. Another method can be used as the authentication method, and it is possible to use a biometric authentication according to an embodiment described later or the like. When human-body communication authentication processing of Step S78 is completed, the flow advances to Step S80 to verify whether or not the authentication has been OK. If OK, in Step S82, data for the purchase of the selected music track is called, and an instruction to modulate the data into the transmission signal for the human-body communication is issued. The transmission signal obtained by modulating the music track data is applied to the transmission/reception electrode 62 in accordance with an instruction of Step S84. Therefore, the music track data is transmitted to the cellular telephone 4 through the finger 8. However, the music track data is being temporarily transmitted in this stage and cannot be reproduced unless an enabling signal described later is received.

Subsequently in Step S86, it is verified whether or not the finger touch on the touch panel 40 is continued. If the continued touch is detected as a result thereof, the flow advances to Step S88 to verify whether or not the temporary transmission of the music track data has been completed. If the temporary transmission has not been completed, the flow returns to Step S86 to repeat Step S86 and Step S88 after that unless the temporary transmission is completed or the finger 8 is released from the display surface 38, and the temporary transmission of the music track data is continued. If completion of the temporary transmission is detected in Step S88, human-body communication payment processing of Step S90 is started. This is processing for executing an electronic payment by a predetermined procedure between a bank account of the dealer that manages the music track data sales device 12 and a bank account of the user 2 who owns the cellular telephone 4 that are previously agreed upon.

When the human-body communication payment processing of Step S90 is completed, it is verified in Step S92 whether or not a payment is OK. If the account does not exist or if the balance is short, the verification of Step S92 does not result in OK. If it is confirmed that the payment is OK in Step S92, the flow advances to Step S94 to transmit the enabling signal for enabling temporary data and allowing reproductions thereof. After the above-mentioned processing, it is confirmed again in Step S98 whether or not all the processing is OK, and if OK, the flow is finished. In contrast thereto, if it is not confirmed in Step S98 that all the processing is OK, the flow advances to Step S86 to allow Step S86 to Step S98 to be retried. This is performed so as to handle the situations when there occurs some unexpected communication trouble. This retrial may be performed any number of times unless a loop between Step S86 and Step S98 is escaped.

In contrast thereto, if the continued touch is not detected in Step S86, the flow advances to Step S100. This means that the human-body communication path through the finger 8 has been disconnected. Therefore, in Step S100, the human-body communication icon 120 of FIG. 2(B) is caused to blink to thereby issue an alert that the finger 8 has been released, and while maintaining the alert, in the subsequent Step S102, the progress of the flow is set in a standby mode for a predetermined time in order to give a grace period for performing re-authentication. The re-authentication refers to an operation for causing the finger 8 to touch the authentication/download/payment button 122 again. After the lapse of the standby time, it is verified in Step S104 whether or not an NG detection of Step S98 has reached three times, and if so, the flow is immediately finished. On the other hand, if it is not detected in Step S104 that the NG detection of Step S98 has reached three times, the flow returns to Step S70 to allow the flow of FIG. 5 to be retried from the start. The flow returns to Step S70 in order to immediately finish the flow if another touch is not made by the finger 8 irrespective of the standby of Step S102. In contrast thereto, if the authentication/download/payment button 122 is being touched again by the finger 8 when the flow returns to Step S70, the flow advances to Step S72, and hence it is possible to retry the flow of FIG. 5 from the establishment of the human-body communication.

On the other hand, if the human-body communication response from the cellular telephone 4 is not detected in Step S72, the flow advances to Step S106 to verify whether or not there is a response from the cellular telephone 4 in accordance with the short-distance communication protocol between the short-distance communication unit 66 of the music track data sales device 12 and the short-distance communication unit 20 of the cellular telephone 4. If this response is not received either, it is not possible to purchase the music track data by using communication, and hence the flow is immediately finished. On the other hand, if a short-distance communication response from the cellular telephone 4 is detected in Step S106, the flow advances to Step S108 to perform the cellular telephone response display. This corresponds to displaying only the cellular telephone icon 118 in FIG. 2(B). Then, the flow advances to short-distance communication processing of Step S110 to execute authentication/download/payment processing for purchasing the music track data in accordance with a predetermined short-distance communication procedure, and is finished.

In the first embodiment as described above, the headphones 6 are structured so as to be personally owned by the user 2, but may also be structured as headphones dedicated to trial-listening which are provided to the audio shop in which the music track data sales device 12 is installed. In this case, as the transmission signal for the human-body communication for the trial-listening, one dedicated to the audio shop can be set and therefore does not need to be publicly-announced to the external portion of the audio shop or tapped by means other than the provided headphones.

Further, as trial-listening means personally owned by the user 2, the telephone receiver included in the telephone function unit 16 of the cellular telephone 4 itself can also be used instead of the headphones 6. In this case, the frequency of the transmission signal for the human-body communication within the cellular telephone 4 needs to be set to the above-mentioned frequency for trial-listening. Accordingly, when the audio signal of the music track designated by the user 2 is modulated into the transmission signal having the frequency for trial-listening and output from the music track data sales device 12, the transmission signal is conveyed to the transmission/reception electrode 26 of the cellular telephone 4 through the finger 8 of the user 2 making the touch for designating the music track by the human-body communication indicated by the arrow 50. The received transmission signal is demodulated by the modulation/demodulation unit 24 and transmitted to the telephone function unit 16 by a signal line (not shown) as an audio signal (not shown), and hence the user 2 can trial-listen the music track selected by the finger 8 on the touch panel 40 by using the telephone receiver of the cellular telephone 4.

Second Embodiment

FIG. 6 are display screen diagrams illustrating display on a display surface of the touch panel of a data sales device related to a second embodiment of an information input/output device according to the embodiment mode of the present invention. The second embodiment is structured as a device that sells electronic ticket data for admission to an event venue. The structure is a block structure common to the first embodiment of FIG. 1 except that the headphones 6 are not provided. However, in understanding the second embodiment, the "music track data" of FIG. 1 is assumed to be read as the "electronic ticket data". Further, in the case of the second embodiment, the audio signal output unit 58 is not necessary for an electronic ticket data sales device 12.

On the other hand, with regard to the cellular telephone 4, the hardware structure according to the second embodiment is common to the first embodiment because only contents of the data to be received are different. That is, the cellular telephone 4 has a common structure for both the download of the music track and the download of the electronic ticket data. The second embodiment has circumstances different from the first embodiment in that an information amount of the electronic ticket data is extremely smaller than the music track data with a shorter time required for communication, and hence little concern is particularly needed about the release of the finger 8 during the communication unlike the first embodiment. It may be assumed that necessary data is downloaded onto the cellular telephone 4 by the human-body communication the moment the touch panel 40 is touched to select data.

In display screen diagrams according to the second embodiment of FIG. 6, parts corresponding to those of the first embodiment of FIG. 2 are denoted by reference numerals in the 200s with the same numbers in the tens and ones places. With regard to the parts that can be understood in the same manner as the first embodiment, the description of the second embodiment may be simplified by incorporating the description of the first embodiment. FIG. 6(A) illustrates the screen for purchase data selection similar to the first embodiment, and an event schedule including a sports event indicated by a baseball icon 202 or the like, a travel event indicated by a small bus icon 203 or the like, and music concert event indicated by a performance icon 204 or the like is displayed in date order along with comments 206 such as dates. The display can also be performed in event category order.

The user 2 can select an event by using the finger 8 to touch any one of the icons. FIG. 6(A) indicates a state in which the finger 8 of the user 2 is touching the performance icon 204, which is detected by the function of the touch position detection unit 54 of the touch panel 40, and a selection cursor 208 is displayed around the performance icon 204 to notify the user 2 that the selection of the event has been recognized by the touch panel 40. Unlike the first embodiment, in the state of FIG. 2(A), only touch position detection is performed by a touch panel function, and the human-body communication is not performed.

Note that, once the selection of the event is recognized by the electronic ticket data sales device 12, even if the finger 8 is released from the display surface 38, the fact that the event corresponding to the performance icon 204 was selected is stored/retained by the electronic ticket data sales device 12, and the display of the selection cursor 208 is also continued. When the finger 8 of the user 2 touches a purchase button 212 in this state, purchase processing for the selected event is started, and a screen for purchase of FIG. 6(B) is displayed. On the other hand, when the finger 8 of the user 2 touches a finish button 214, the memory of the selected event is cleared, and the display of the selection cursor 208 disappears as well.

In FIG. 6(B), the performance icon 204 corresponding to the selected event is enlarged/displayed, and detailed comments 216 such as a concert program, an event date, and a venue are displayed. In the second embodiment, which is in such a state of FIG. 6(B), the public frequency of a human-body communication transmission signal dedicated to the purchase is set to allow the human-body communication. In the same manner as in the first embodiment, when an authentication/download/payment button 222 is touched on the screen of FIG. 6(B), a human-body communication path is formed between the electronic ticket data sales device 12 and the cellular telephone 4 through the finger 8, and a cellular telephone icon 218 and a human-body communication icon 220 are displayed when there is a response from the cellular telephone 4 in accordance with the human-body communication protocol. At the same time, the touch position detection unit 54 detects the touch on the authentication/download/payment button 222, and performs a series of processing from the authentication of the cellular telephone 4, through a transmission of the electronic ticket data from the electronic ticket data sales device 12 to the cellular telephone 4, to the electronic payment processing related to the fee payment between the electronic ticket data sales device 12 and the cellular telephone 4.

Note that, in the same manner as in the first embodiment, also in the state of FIG. 6(B), when the finish button 214 is touched instead of touching the authentication/download/payment button 222, the processing is canceled without starting the purchase of the electronic ticket. Further, the electronic ticket data sales device 12 is allowed to perform an electronic ticket sales transaction with the cellular telephone 4 by the short-distance communication unit 66 as well, and in the same manner as in the first embodiment, the purchase payment for the electronic ticket data is enabled by the short-distance communication instead of the human-body communication. Then, in the same manner as in the first embodiment, when there is a communication response from the cellular telephone 4 in accordance with the short-distance communication protocol, only the cellular telephone icon 218 is displayed, while the human-body communication icon 220 is caused to disappear in the same manner as in the first embodiment.

The details of the functions of the sales device control unit 46 according to the second embodiment can be basically understood by incorporating the flowchart of the first embodiment by reading the "music track" as the "event". Further, in the second embodiment, there is no "trial-listening", and hence an understanding is obtained by reading the "trial-listening" simply as the "selection". Further, in the second embodiment, Step S6 of FIG. 3, Step S40 of FIG. 4, and the subsequent steps are not necessary.

Third Embodiment

FIG. 7 are display screen diagrams illustrating display on a display surface of the touch panel of a data sales device related to a third embodiment of an information input/output device according to the embodiment mode of the present invention. The third embodiment is structured as an image data sales device. The structure is a block structure common to the first embodiment of FIG. 1 except that the headphones 6 are not provided. However, in understanding the third embodiment, the "music track data" of FIG. 1 is assumed to be read as the "image data".

Further, in the case of the third embodiment, the "audio signal output unit 58" of an image data sales device 12 is supposed to be read as "sample image providing unit 58". The sample image providing unit 58 creates a sample image having a small information amount with a data amount reduced from an original image within an image data storage unit 56. Such a sample image requires a shorter time for a transfer but is inferior in image quality, and is distributed at no charge as necessary. Note that, the sample image providing unit 58 is not limited to the case of newly creating the sample image based on data within the image data storage unit 56, but in a case where the image data storage unit 56 prepares and stores a plurality of image data items having different image sizes for an identical image, may have a function of extracting an appropriate item for the sample image therefrom. A preferred example of the sample image prepared as described above is a so-called thumbnail image.

On the other hand, with regard to the cellular telephone 4 of the third embodiment, the hardware structure is common to the first embodiment because only contents of the data to be received are different. That is, the cellular telephone 4 has a common structure for both the download of the music track data and the download of the image data. Note that, in the third embodiment, the sample image requires a short time for communication because of being small in the data amount, and it may be assumed that necessary data is downloaded onto the cellular telephone 4 by the human-body communication the moment the touch panel 40 is touched to select data.

In display screen diagrams according to the third embodiment of FIG. 7, parts corresponding to those of the first embodiment of FIG. 2 are denoted by reference numerals in the 300s with the same numbers in the tens and ones places. With regard to the parts that can be understood in the same manner as the first embodiment, the description of the third embodiment may be simplified by incorporating the description of the first embodiment. FIG. 7(A) illustrates the screen for purchase data selection similar to the first embodiment, on which sample images 302 and 304 and the like are displayed. The display can be sorted in appropriate order such as date order or category order.

The user 2 can select an image to be purchased by using the finger 8 to touch any one of the sample images. FIG. 7(A) indicates a state in which the finger 8 of the user 2 is touching the sample image 304, which is detected by the function of the touch position detection unit 54 of the touch panel 40, and a selection cursor 308 is displayed around the sample image 304 to notify the user 2 that the selection of the image has been recognized by the touch panel 40.

On the other hand, a cellular telephone icon 311 and a human-body communication icon 313 that are illustrated in FIG. 7(A) are displayed when the cellular telephone 4 is in a human-body communication state through the finger 8 of the user 2 and when there is a response from the cellular telephone 4 in accordance with the human-body communication protocol. This allows the user 2 to know that the human-body communication is enabled. Further, while the cellular telephone icon 311 and the human-body communication icon 313 are displayed and when the cellular telephone 4 is set in a sample image free-of-charge acquisition mode, by touching a desired sample image, sample image data provided by the sample image providing unit 58 corresponding to the touched sample image (for example, sample image 304) is sent to the cellular telephone 4 by the human-body communication through the touching finger 8 and stored in the storage unit 18 at no charge. The sample image data thus stored on the cellular telephone 4 later serves as access information used in purchasing the original image data.

Note that, once the selection of the image is recognized by the image data sales device 12, even if the finger 8 is released from the display surface 38, the fact that the image corresponding to the sample image 304 was selected is stored/retained by the image data sales device 12, and the display of the selection cursor 308 is also continued. When the finger 8 of the user 2 touches a purchase button 312 in this state, the purchase processing for the original image data corresponding to the selected sample image is started, and a screen for purchase of FIG. 7(B) is displayed. On the other hand, when the finger 8 of the user 2 touches a finish button 314, the memory of the selected image is cleared, and the display of the selection cursor 308 is disappeared as well.

In FIG. 7(B), the sample image 304 corresponding to the selected image is enlarged/displayed. Here, when an authentication/download/payment button 322 is touched, in the same manner as in the first embodiment, a human-body communication path is formed again between the image data sales device 12 and the cellular telephone 4 through the finger 8, and a cellular telephone icon 318 and a human-body communication icon 320 are displayed when there is a response from the cellular telephone 4 in accordance with the human-body communication protocol. At the same time, the touch position detection unit 54 detects the touch on the authentication/download/payment button 322, and performs a series of processing from the authentication of the cellular telephone 4, through a transmission of the original image data from the image data sales device 12 to the cellular telephone 4, to the electronic payment processing related to the fee payment between the image data sales device 12 and the cellular telephone 4. Note that, in the third embodiment, in any one of states of FIG. 7(A) and FIG. 7(B), a common public frequency is set as the frequency of the transmission signal for the human-body communication. This is because, in the third embodiment, the image data is provided by the image data sales device 12 with a destination of the provision limited to the cellular telephone 4, and hence the frequency of the transmission signal does not need to be changed unlike the first embodiment.

Note that, in the same manner as in the first embodiment, also in the state of FIG. 7(B), when the finish button 314 is touched instead of touching the authentication/download/payment button 322, the processing is canceled without starting the purchase of the original image. Further, the image data sales device 12 is allowed to perform an image sales transaction with the cellular telephone 4 by the short-distance communication unit 66 as well, and in the same manner as in the first embodiment, the purchase payment for the image data is enabled by the short-distance communication instead of the human-body communication. Then, in the same manner as in the first embodiment, when there is a communication response from the cellular telephone 4 in accordance with the short-distance communication protocol, only the cellular telephone icon 318 is displayed, while the human-body communication icon 320 is caused to disappear in the same manner as in the first embodiment.

The details of the functions of the sales device control unit 46 according to the third embodiment can be basically understood by incorporating the flowchart of the first embodiment by reading the "music track" as the "image", the "audio signal" as the "sample image data", the "trial-listening" as the "sample data free-of-charge acquisition", the "headphones" as the "cellular telephone", and the "music track data" as the "original image data". Further, in the third embodiment, there is no "trial-listening", and hence an understanding is obtained by reading the "trial-listening" simply as the "selection". Further, Step S6 and Step 20 of FIG. 3 are understood by being read as "SET FREQUENCY FOR HUMAN-BODY COMMUNICATION".

The above-mentioned third embodiment is structured as an image data sales device, but the image data sales device described above can be structured not only for commercial image sales but also as a device for exchanging image data between private individuals at no cost. In this case, it is preferred that the device for exchanging image data be structured by being built into a cellular telephone, a digital camera, an image display device, and the like that are owned by a private individual. To implement those, a display unit provided to a cellular telephone, a digital camera, the image display device, and the like are structured as a display function unit, a touch panel function unit, and a contact unit for human-body communication as illustrated in FIG. 1.

Specifically, for example, in the case of implementation as the cellular telephone, the display unit 15 of the cellular telephone 4 of FIG. 1 may be structured as a touch panel, and the transmission signal output by the transmission/reception electrode 26 may be applied to such a touch panel. With such a structure, for example, between the cellular telephones, when the user touches an image displayed on the display unit of the cellular telephone of the party at the other end (hereinafter, referred to simply as "other party") while holding his/her own cellular telephone, image data stored on the cellular telephone of the other party is transferred to his/her own cellular telephone by the human-body communication through the touching finger. Further, the user can also receive the image data transferred in the same manner by touching the body of the other party while causing the other party to touch the image stored on the cellular telephone of the other party.

On the other hand, when the user uses his/her right thumb to touch one of the displayed images while holding his/her own cellular telephone with the right hand and uses his/her left hand to touch the image display device such as an electronic photo frame having a human-body communication function, it is also possible to transfer and display the selected image from his/her own cellular telephone to the image display device by the human-body communication through the right thumb/finger being used to touch and select the image. In this case, if the display surface of the image display device is structured as the display function unit, the touch panel function unit, and the contact unit for human-body communication as described in the third embodiment, it is also possible to cause the transferred image to be displayed in a desired position on the screen designated by making a touch with a left finger.

Fourth Embodiment

Figure 8:
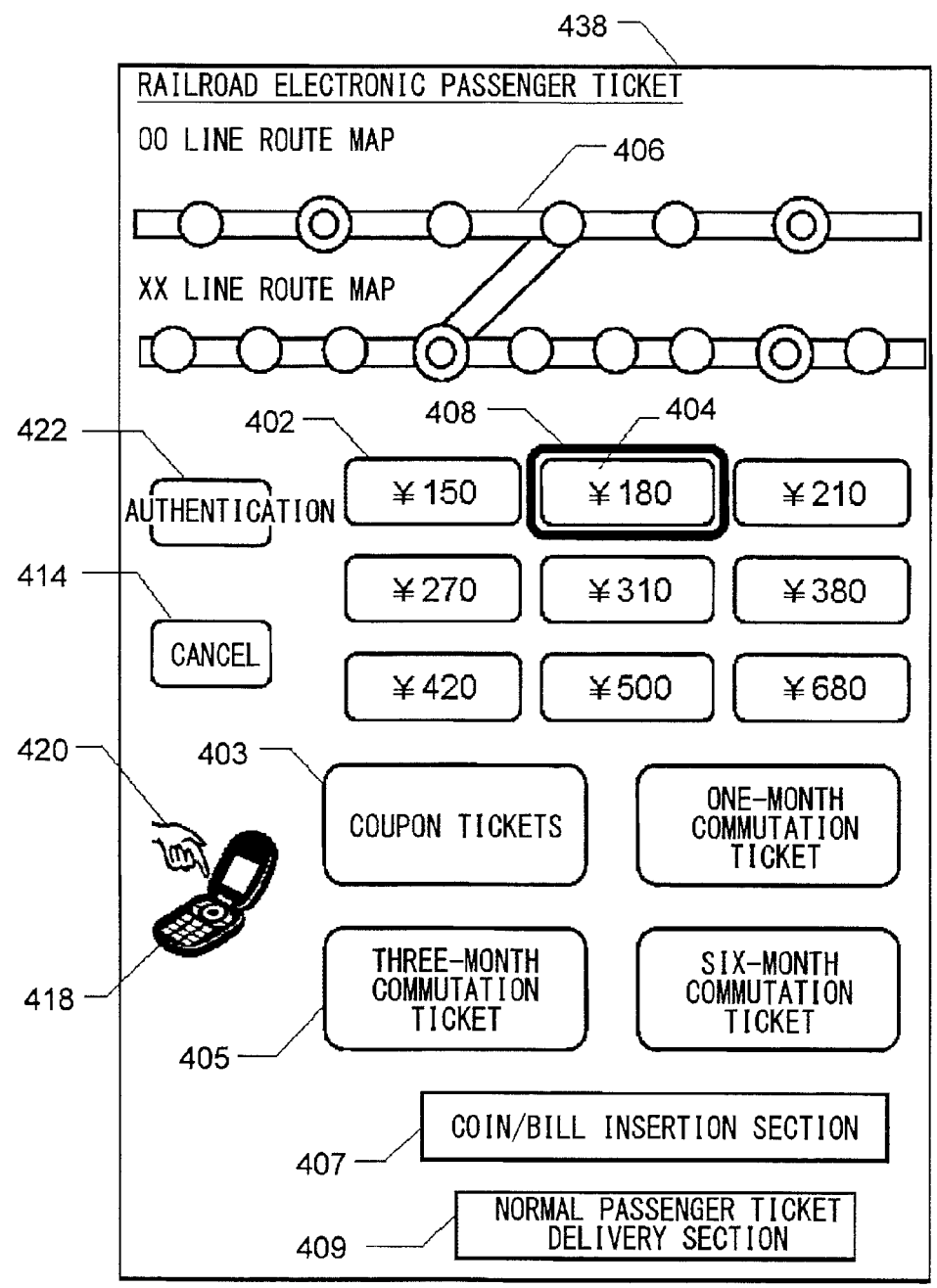
FIG. 8 A display screen diagram illustrating display of a touch panel according to a fourth embodiment of the present invention. (fourth embodiment)

FIG. 8 is a display screen diagram illustrating display on a display surface of the touch panel of a data sales device related to a fourth embodiment of an information input/output device according to the embodiment mode of the present invention. The fourth embodiment is structured as an electronic passenger ticket data sales device for using mass transport systems. The structure is a block structure common to the first embodiment of FIG. 1 except that the headphones 6 are not provided. However, in understanding the fourth embodiment, the "music track data" of FIG. 1 is assumed to be read as the "electronic passenger ticket data". Further, in the case of the fourth embodiment, the audio signal output unit 58 is not necessary for an electronic passenger ticket data sales device 12.

On the other hand, with regard to the cellular telephone 4, the hardware structure according to the fourth embodiment is common to the first embodiment because only contents of the data to be received are different. That is, the cellular telephone 4 has a common structure for both the download of the music track and the download of the electronic passenger ticket data. The fourth embodiment has circumstances different from the first embodiment in that an information amount of the electronic passenger ticket data is extremely smaller than the music track data as in the case of the second embodiment.

In the display screen diagram according to the fourth embodiment of FIG. 8, parts corresponding to those of the first embodiment of FIG. 2 are denoted by reference numerals in the 400s with the same numbers in the tens and ones places. FIG. 8 illustrates the same screen for purchase data selection as in the first embodiment, and a passenger ticket icons such as fare indications 402 and 404, a coupon ticket icon 403, a commutation ticket icon displayed with a three-month commutation ticket 405 indication, and the like are displayed on a display surface 438 along with a route map 406 to which train fares are appended as reference display information. However, on an initial screen, there is no display other than the route map 406 and an authentication button 422. In this state, the display surface 438 is applied with the transmission signal having the public frequency, and is in a standby state for the human-body communication. Further, the same frequency is set on the cellular telephone 4 side, and is in a human-body communication standby state. Note that, the electronic passenger ticket data sales device 12 according to the fourth embodiment can function as a normal ticket-vending machine, in which icons or the like of passenger tickets that can be purchased for the inserted amount of money when a corresponding amount of money is inserted into a coin/bill insertion section 407, and when one thereof is touched, the corresponding paper passenger ticket is delivered from a normal passenger ticket delivery section 409.

To purchase an electronic passenger ticket on the display surface 438 of FIG. 8, the user 2 first uses the finger 8 to touch the authentication button 422. Therefore, a human-body communication path is formed between the electronic passenger ticket data sales device 12 and the cellular telephone 4 through the finger 8, and a cellular telephone icon 418 and a human-body communication icon 420 are displayed when there is a response from the cellular telephone 4 according to the human-body communication protocol. Then, it is authenticated whether or not the cellular telephone 4 is eligible for the payment by the human-body communication through the authentication button 422 being touched, and if OK, the passenger ticket icons 402 and the like, the coupon ticket icon 403, and the commutation ticket icons 405 and the like that correspond to the payable amount of money are displayed on the display surface 438. Such an authentication result is stored on the electronic passenger ticket data sales device 12 even if the finger 8 is released from the authentication button 422. Note that, this memory can be canceled by touching a cancel button 414, and if there is a touch on the cancel button 414, the passenger ticket icons 402 and the like are caused to disappear to return to the initial screen.

It is possible to select passenger ticket data to be purchased by touching any one of the passenger ticket icons 402 and the like in a state in which the authentication result is stored. FIG. 8 indicates a state in which the finger 8 of the user 2 is touching the passenger ticket icon 404, which is detected by the function of the touch position detection unit 54 of the touch panel 40, and a selection cursor 408 is displayed around the passenger ticket icon 404. At the same time, by the human-body communication through the finger 8 of the user 2 touching the passenger ticket icon 404, electronic passenger ticket data for the corresponding amount of money is provided to and stored on the cellular telephone 4, and the payment is performed between the cellular telephone 4 and the electronic passenger ticket data sales device 12. Accordingly, the display of a selection icon 408 also serves as an indication for notifying the user 2 of the above-mentioned acquisition of the electronic passenger ticket data and completion of the payment. The electronic passenger ticket data stored on the cellular telephone 4 is authenticated during passage through a wicket by the short-distance communication between the short-distance communication unit 20 of the cellular telephone and the short-distance communication unit provided to the wicket, and permits the user 2 to pass through the wicket. A function of the short-distance communication is a normal structure at the wicket that has already been widespread. Note that, in a case where the wicket is provided with the human-body communication function, it is possible to perform ticket examination by the human-body communication through the transmission/reception electrode 26. In this case, the user touches a predetermined part of the wicket to thereby pass through the wicket.

The details of various elements within the functions of the sales device control unit 46 according to the fourth embodiment can be understood by seeking the corresponding elements from the flowcharts related to the first embodiment. In the fourth embodiment, it needs to be noted that the touch for the authentication is distinguished from the touch for the electronic passenger ticket acquisition and the electronic payment. However, an understanding is obtained by replacing the human-body communication for the "trial-listening" according to the first embodiment (here, the case where the trial-listening is performed by the cellular telephone 4 is applied correspondingly) by the human-body communication for the "authentication" according to the fourth embodiment, and replacing the human-body communication for "purchasing the music track data" according to the first embodiment by the human-body communication for "purchasing the electronic passenger ticket data" according to the fourth embodiment. Note that, in the fourth embodiment, the flowchart is assumed to be understood by reading the frequency of the transmission signal used for the human-body communication between the cellular telephone 4 and the electronic passenger ticket data sales device 12 as being the same both in the "authentication" and in the "purchasing the electronic passenger ticket data".

Fifth Embodiment

Figure 9:
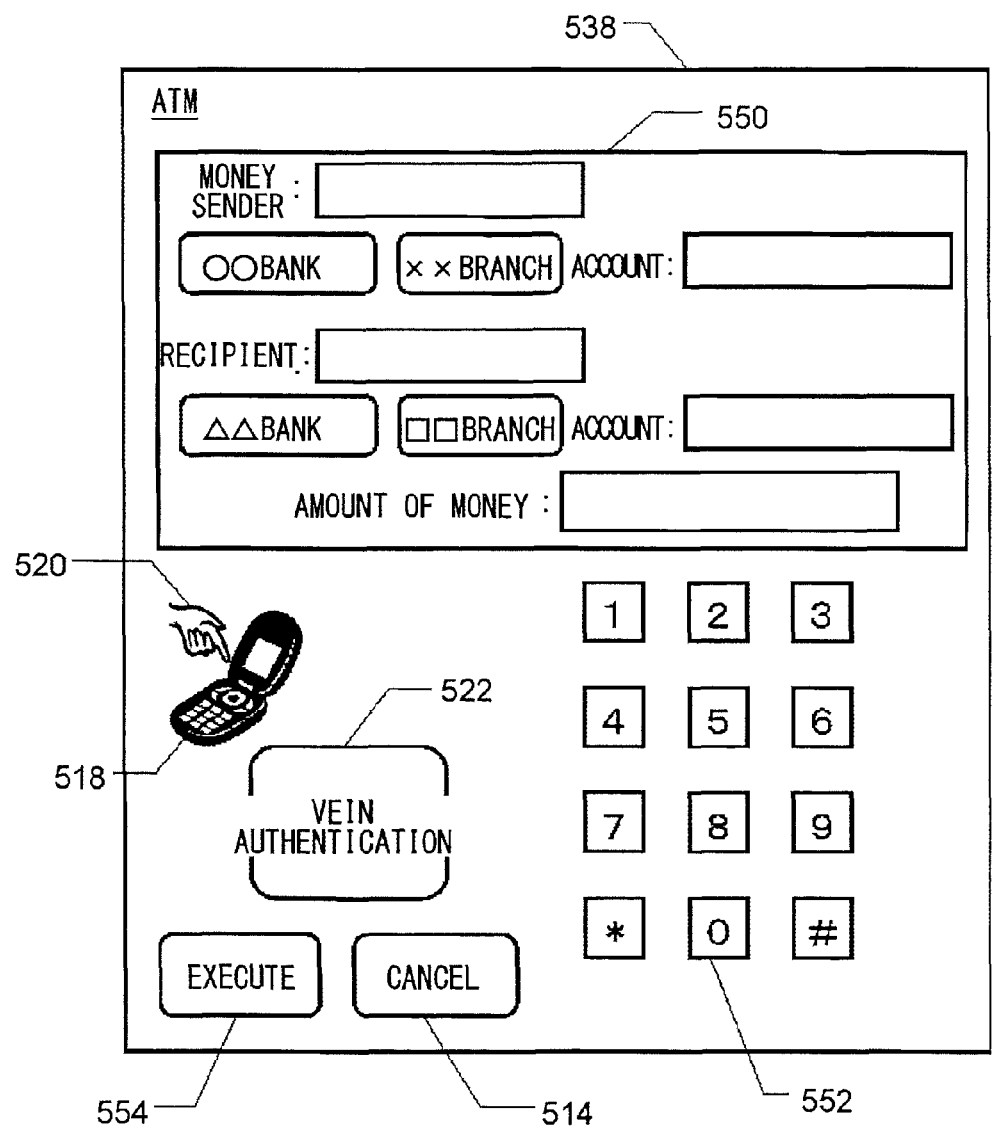
FIG. 9 A display screen diagram illustrating display of a touch panel according to a fifth embodiment of the present invention. (fifth embodiment)

FIG. 9 is a display screen diagram illustrating display on a display surface of the touch panel related to a fifth embodiment of an information input/output device according to the embodiment mode of the present invention. A fifth embodiment is structured as an automatic teller machine at a bank. The structure is a block structure common to the first embodiment of FIG. 1 except that the headphones 6 are not provided. However, in understanding the fifth embodiment, the "music track data sales device" or the "sales device" with reference to FIG. 1 is assumed to be read as the "automatic teller machine" and the "music track data" is assumed to be read as "account book data". Further, in the case of the fifth embodiment, the audio signal output unit 58 is not necessary for an automatic teller machine 12.

On the other hand, with regard to the cellular telephone 4, the hardware structure according to the fifth embodiment is common to the first embodiment because only contents of the data to be received are different. That is, the cellular telephone 4 has a common structure for both the download of the music track and the exchange of the account book data with the bank. The fifth embodiment has circumstances different from the first embodiment in that, in the same manner as in the cases of the second embodiment and the fourth embodiment, the information amount of the account book data is extremely smaller than the music track data.

In a display screen diagram according to the fifth embodiment of FIG. 9, parts are denoted by reference numerals in the 500s. FIG. 9 illustrates an operation screen used for the automatic teller machine, and a money sending screen is illustrated on a display surface 538 as an example. Specifically, full names, bank names, branch names, and account numbers of a money sender and a recipient, an amount of money to be sent, and the like are displayed in a transaction request data display section 550. The bank, the branch code number, and the account number of the recipient, the amount of money to be sent, and the like are input by touching a numeric keypad 552 as appropriate. In this state, the display surface 538 is applied with the transmission signal having the public frequency, and is in a standby state for the human-body communication. Further, the same frequency is set on the cellular telephone 4 side, and is in the human-body communication standby state.

To input/output/transfer money by using the display surface 538 of FIG. 9, the user 2 first uses the finger 8 or a palm to touch a vein authentication section 522. Therefore, a human-body communication path is formed between an automatic teller machine 12 and the cellular telephone 4 through the finger 8 or the palm, and a cellular telephone icon 518 and a human-body communication icon 520 are displayed when there is a response from the cellular telephone 4 according to the human-body communication protocol. Then, the full name, the bank name, and the branch name of the user 2 (money sender), the amount of money to be sent, and the like that are stored on the cellular telephone 4 are transmitted to the automatic teller machine 12 by the human-body communication through the vein authentication section 522 being touched.

The automatic teller machine 12 authenticates the user 2 and the account thereof by electronic data such as the account of the user 2 transmitted from the cellular telephone 4 by the human-body communication and vein data detected by the vein authentication section 522. In that case, data is transmitted from an automatic teller machine 12 side to the cellular telephone 4 side by the human-body communication, and the authentication is executed by two-way human-body communication. If the authentication is OK, the full name, the bank name, the branch name, and the account number of the money sender are displayed in the transaction request data display section 550 based on information received from the cellular telephone 4. By viewing this display, the user 2 is allowed to know that the authentication has become OK. The above-mentioned authentication result and transaction data are stored on the automatic teller machine 12 even if the finger 8 or the palm is released from the vein authentication section 522. Note that, this memory can be canceled by touching a cancel button 514, and if there is a touch on the cancel button 514, the display of the transaction request data display section 550 is caused to disappear to return to the initial screen.

To execute the transaction, a transaction button 554 is touched in a state in which the authentication result and the transaction data are stored. When the touch is detected by the touch panel 40, first, execution processing is performed on the automatic teller machine 12 side, and the transaction is settled. Then, the fact is displayed in the transaction request data display section 550 for a predetermined time. At the same time, the corresponding transaction data, account balance data of the transaction result, and the like are provided from the automatic teller machine 12 to the cellular telephone 4 by the human-body communication through the finger 8 of the user 2 touching the transaction button 554, and an entry thereof is registered in an electronic bankbook stored in the storage unit 18 of the cellular telephone 4. In the above-mentioned manner, in the fifth embodiment, the transmission of account data and the like being an object of the authentication and the transmission/reception of the authentication information are performed by the human-body communication through the finger 8, the palm, or the like being used for the touch for the biometric authentication such as the vein authentication or the like, and the reception of the transaction result is performed by the human-body communication through the finger 8 or the like being used for the touch for transaction execution. Note that, the details of various elements within the functions of an automatic teller machine control unit 46 can be understood with reference to the flowcharts related to the first embodiment in the same manner as in the fifth embodiment.

Various features of the present invention described above are not limited to the implementations of the above-mentioned embodiments, and can be widely applied. For example, a notice such as a poster is structured so as to be capable of the human-body communication, and is configured to enable the human-body communication to be performed with a person who owns the cellular telephone having such a structure as described above. With this structure, from a specific part of the notice which has been touched by the owner of the cellular telephone with his/her finger, electronic information regarding to that part can be automatically input to the cellular telephone by the human-body communication. In this case, examples of preferred electronic information acquired by the human-body communication include a uniform resource locator (URL) of a website that provides detailed information regarding the specific part being touched.

Sixth Embodiment

FIG. 10 are display screen diagrams illustrating display on the display surface of the touch panel related to a sixth embodiment of an information input/output device according to the embodiment mode of the present invention. The sixth embodiment is structured as a home shopping device that causes a television set and the cellular telephone to cooperate. The structure of the sixth embodiment is a block structure common to the first embodiment of FIG. 1 except that the headphones 6 are not provided. However, in understanding the sixth embodiment, the "music track data sales device" or the "sales device" with reference to FIG. 1 is assumed to be read as the "television set" and the "music track data" is assumed to be read as the "product data". Further, in the case of the sixth embodiment, the audio signal output unit 58 is not necessary for a television set 12.

On the other hand, with regard to the cellular telephone 4, the hardware structured according to the sixth embodiment is common to the first embodiment because only the data to be transmitted/received is different. That is, the cellular telephone 4 has a common structure for both the download of the music track and data exchange with the television set (home shopping displaying device) 12 to cooperate with in home shopping. The sixth embodiment has circumstances different from the first embodiment in that, in the same manner as in the cases of the second embodiment, the fourth embodiment, and the fifth embodiment, the information amount of data to be exchanged is extremely smaller than the music track data. Although not shown in FIG. 1, the television set 12 is assumed to be provided with all normal components of the television set such as a tuner and speakers.

On display screens of the television set 12 according to the sixth embodiment of FIG. 10, respective parts of display contents thereof are denoted by reference numerals in the 600s. Note that, in the same manner as in FIG. 2, a display surface 638 of the television set 12 is provided with the touch panel 40 so as to be capable of detecting the touch position of the finger 8, and the transmission/reception electrode 62 allows the human-body communication to be performed through the finger 8 that is touching the display surface 38. When a broadcast comes to product selection screen display on a home shopping program titled "television shopping" or the like, the display surface 638 is automatically applied with the transmission signal having the registered/set frequency, and is brought into the standby state for the human-body communication. At this time, the touch panel function of the display surface 638 is also turned on. Note that, the cellular telephone 4 is also set to the same frequency by manually selecting a home shopping mode in a state in which it is confirmed that the television set 12 registered by a two-way authentication between the short-distance communication unit 20 and the short-distance communication unit 66 exists in the vicinity, and is brought into the human-body communication standby state. Note that, while the short-distance communication unit 20 does not confirm the registered television set 12, the human-body communication standby state is not enabled even if the home shopping mode is manually selected, which prevents a malicious information break-in made by a touch on an unintended item.

Figure 10A:
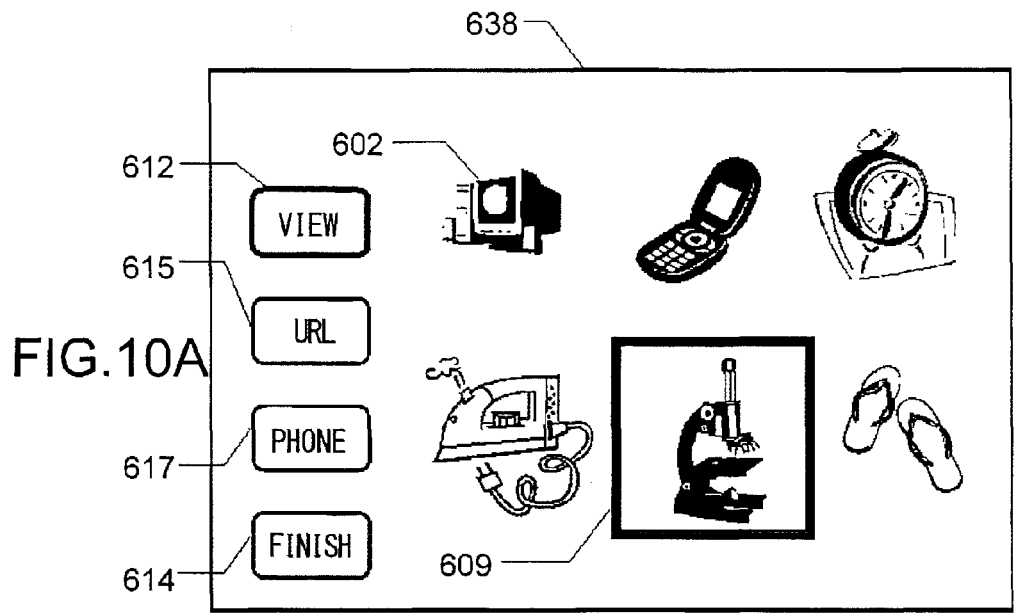
FIG. 10 Display screen diagrams illustrating display of a touch panel according to a sixth embodiment of the present invention. (sixth embodiment)

On the televised home shopping program, at an important point of a product explanation, a product selection screen as illustrated in FIG. 10(A) is displayed on the display surface 638 as a still image for a predetermined time along a progress of the program. As illustrated in FIG. 10(A), a plurality of product icons 602 are displayed on the product selection screen as product menu icons that can be selected. Then, when a view button 612 is touched while the product selection screen is displayed on the display surface 638, a television control unit 46 causes the product data related to all the products within the still image being received by the tuner to be stored in a product data storage unit 56. In addition, the product selection screen display is continued irrespective of the progress of the program. Then, when a finish button 614 is touched, the display of the display surface 638 returns to the display as in the progress of the program. Note that, in FIG. 10(A), in order to indicate that the current state is a "view" state, the view button 612 is kept in a display state of being surrounded by a thick frame as illustrated in FIG. 10(A) during a period after the view button 612 is touched until the finish button 614 is touched. On the other hand, if the view button 612 is not touched, the product selection screen transitions to the next display according to the progress of the program.

Note that, in such a manner as described above, the stored data within the product data storage unit 56 can be called onto the display surface 638 at an arbitrary time point by a predetermined reproduction operation, and the display of the broadcast program is replaced by the display of FIG. 10(A) by the reproduction operation. Also in the case of reproduction, when the finish button 614 is touched, the display of the display surface 638 returns to the display as in the progress of the program.

Figure 10B:
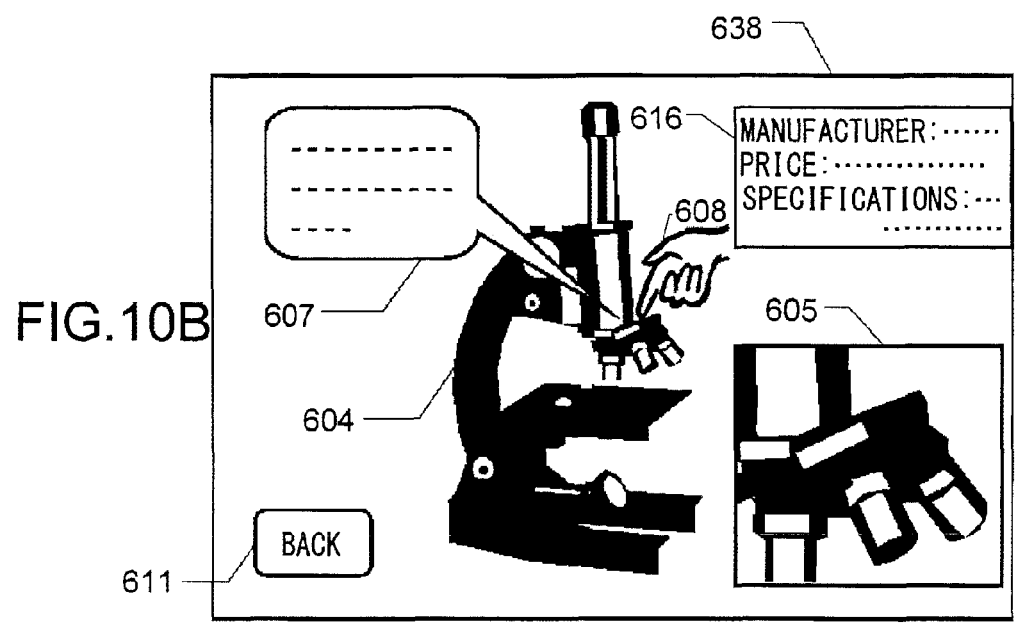

Here, when any one of the product icons is touched by using a finger 608 with product menu icon display being displayed in the "view" state as illustrated in FIG. 10(A), a selection cursor 609 is displayed around the product icon to effect active display with respect to selection operation, and immediately after that, the display is switched to a product detail information screen of FIG. 10(B). Note that, FIGS. 10(A) and (B) illustrated in a case where a microscope is selected as the product. In FIG. 10(B), an enlarged image 604 of the product corresponding to the selected product icon is displayed, and detailed comment information 616 on the product such as a manufacturer, a price, and specifications are displayed as well. The detailed comment information 616 can be captured into the storage unit 18 of the cellular telephone 4 by the human-body communication by being touched by the finger 608.

Further, when a desired part of the enlarged image 604 of the product is touched by the finger 608 in the state of FIG. 10(B), a partially enlarged image 605 thereof is displayed, and description information 607 on that part is displayed as well. The description information can be captured into the storage unit 18 of the cellular telephone 4 by the human-body communication through the finger 608 touching the desired part. Note that, in FIG. 10(B), when a "back" button 611 is touched by the finger 608, the display of the display surface 638 returns to the display of FIG. 10 (A).

On the other hand, when a URL button 615 is touched in a product selection screen display state of FIG. 10(A), a URL acquisition mode is enabled to enter a display state in which the URL button 615 is surrounded by a thick frame, and the product selection screen display is continued irrespective of the progress of the program. The URL mode is a mode for selecting the product whose purchase has been determined in the home shopping and acquiring a URL for connecting to a website on which a purchase procedure therefor is to be performed. When any one of the product icons is touched by using the finger 608 in the URL mode, the selection cursor 609 is displayed around the product icon to effect the active display with respect to the selection operation, and the URL to be used for the product purchase can be captured into the storage unit 18 of the cellular telephone 4 by the human-body communication through the touching finger 608. Then, the purchase procedure itself can be performed by using the captured URL to access the website from the cellular telephone 4 via the Internet. The access is performed through the telephone line handled by the communication function of the telephone function unit 16. This allows the access to be made without manually inputting the URL. When the finish button 614 is touched in the URL acquisition mode, the display of the display surface 638 returns to the display as in the progress of the program.

Further, when a phone button 617 is touched in the product selection screen display state of FIG. 10(A), a telephone number acquisition mode is enabled to enter a display state in which the phone button 617 is surrounded by a thick frame, and the product selection screen display is continued irrespective of the progress of the program. The telephone number acquisition mode is the mode for selecting the product whose purchase has been determined in the home shopping and acquiring a telephone number for performing a purchase procedure therefor. When any one of the product icons is touched by using the finger 608 in the telephone number acquisition mode, the selection cursor 609 is displayed around the product icon to effect the active display with respect to the selection operation, and the telephone number to be used for the product purchase can be captured into the storage unit 18 of the cellular telephone 4 by the human-body communication through the touching finger 608. Then, the purchase procedure itself can be performed by using the captured telephone number to call a home shopping company from the cellular telephone 4 by using the communication function of the telephone function unit 16. This allows the call to be made without manually inputting the telephone number. When the finish button 614 is touched in the telephone number acquisition mode, the display of the display surface 638 returns to the display as in the progress of the program.

Figure 11:
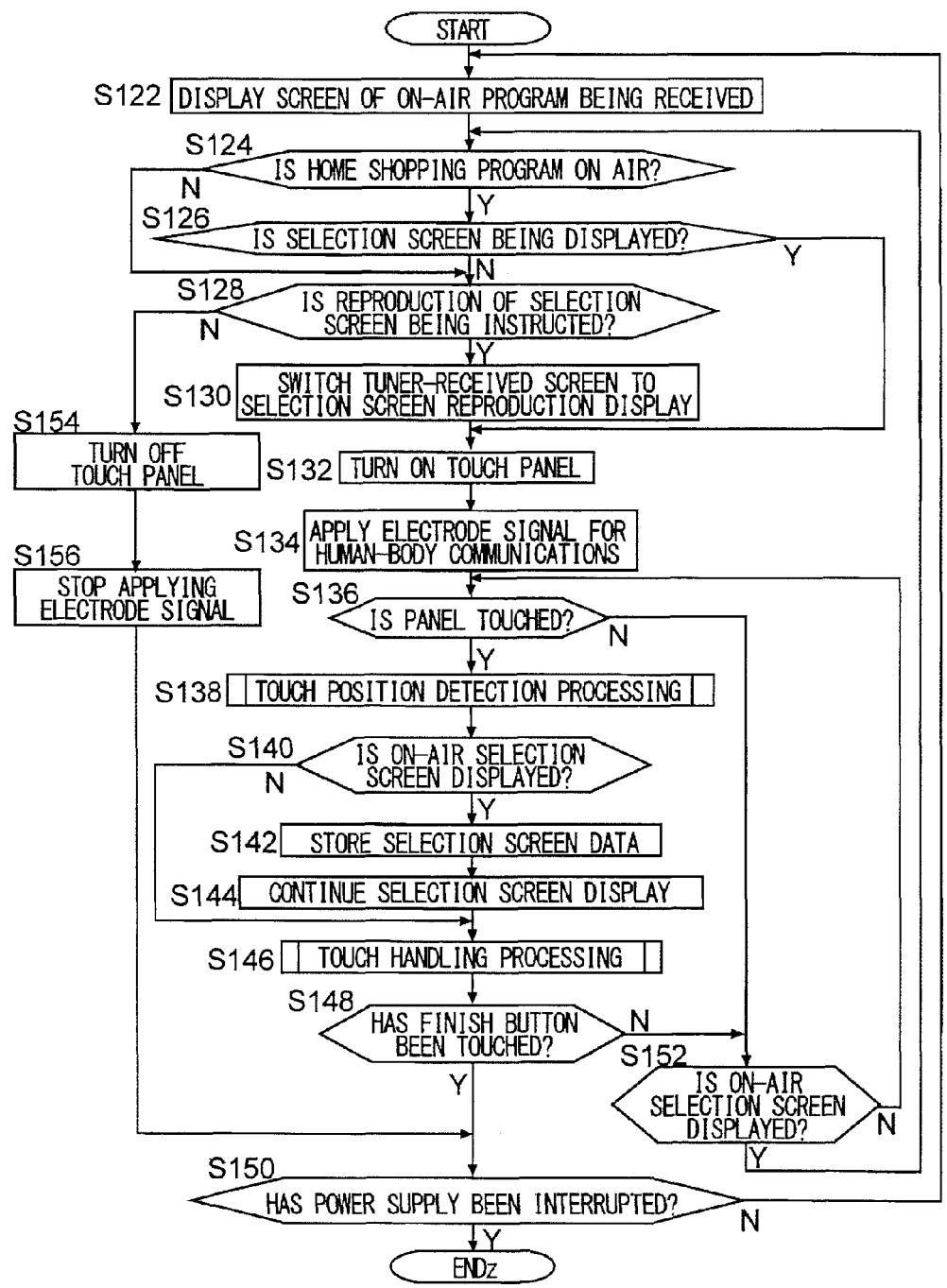
FIG. 11 A flowchart illustrating a function of a television control unit according to the sixth embodiment.

FIG. 11 is a basic flow of the television control unit 46 of the television set 12 according to the sixth embodiment. The flow is started by turning on a main switch and supplying power to the television set 12. When the flow starts, in Step S122, a screen of an on-air television program being received by the tuner is displayed. Subsequently, it is verified in Step S124 whether or not the home shopping program is on the air. If on the air, it is verified in Step S126 whether or not the product selection screen is being displayed, and if not, the flow advances to Step S128.

In Step S128, it is verified whether or not an operation for reproducing the product selection screen stored during a previous home shopping program is being instructed by a television remote control or the like, and if it is detected that the reproduction is being instructed, the flow advances to Step S130. In Step S130, the display of the display surface 638 is switched from the screen of the broadcast received by the tuner to the product selection screen based on the stored information, and the flow advances to Step S132. Meanwhile, also when the product selection screen on the air is being displayed in Step S126, the flow advances to Step S132. In either case, in Step S132, the touch panel function is turned on, and the flow advances to Step S134.

In Step S134, in coordination with the fact that the display surface 638 has come to the product selection screen display, the display surface 638 is automatically applied with the transmission signal having the public frequency, and is brought into the standby state for the human-body communication. Then, it is verified in Step S136 whether or not there is a touch on the touch panel 40 of the display surface 638. If a touch on the touch panel 40 is detected, the touch position detection processing is performed in Step S138. Subsequently, it is verified in Step S140 whether or not a selection display screen is of the on-air program. If of the on-air program, the flow advances to Step S142 to cause the product data related to all the products within the still image for the selection display being received by the tuner to be stored in the product data storage unit 56. In addition, in Step S144, the product selection screen display is continued based on the stored data irrespective of the progress of the program, and the flow advances to Step S146. On the other hand, if it is not detected in Step S140 that the selection display screen is of the on-air program, which means that the selection display screen is being displayed based on the stored information, the flow advances directly to Step S146.

In Step S146, touch handling processing is performed based on the touch position detected in Step S138. Details thereof are described later. In addition, it is verified in Step S146 whether or not the touch on the touch panel 40 is the touch on the finish button 614, and if the finish button 614 is touched, the flow advances to Step S150. In Step S150, it is verified whether or not the main switch has been turned off and the power supply to the television set 12 has been interrupted, and if it is detected that the power supply has been interrupted, the flow is finished. On the other hand, if it is not detected in Step S150 that the power supply has been interrupted, the flow returns to Step S122 to resume the display of the on-air screen of the television program being received by the tuner on the display surface 638.

Further, if no touch on the touch panel 40 is detected in Step S136, the flow advances to Step S152 to verify whether or not the selection display screen being displayed is of the on-air program. If of the on-air program, the flow returns to Step S124 so as to handle a change in the display other than the product selection screen based on the progress of the program. On the other hand, if it is not detected that the selection display screen being displayed in Step S152 is of the on-air program, which means the display is based on the memory, the flow returns to Step S136. Then, until the touch on the touch panel 40 is detected, Step S136 and Step S152 are repeated to wait for the touch. Further, if the touch on the finish button 614 is not detected in Step S148, the flow advances to Step S152 as well. In this case, there is no other case other than the display based on the memory, and hence the flow advances to Step S136. After that, unless the touch on the finish button 614 is detected in Step S148, Step S136 to Step S148 and Step S152 are repeated to handle various touches on the touch panel 40 while continuing the display of the selection display screen based on the memory.

Incidentally, if it is not detected in Step S128 that the reproduction of the selection screen is being instructed, which means that the product selection screen is not being displayed based on the progress of the program or the reproduction and that a normal television program is being displayed, the flow advances to Step S154 to turn off the touch panel function and to Step S156 to automatically stop applying the transmission signal to the transmission/reception electrode 62 so as to inhibit the human-body communication. In this manner, the touch panel function is automatically turned on/off in accordance with the display state of the display surface 638 by combining Step S132 and Step S154, while the human-body communication function is automatically turned on/off in accordance with the display state of the display surface 638 by combining Step S134 and Step S156.

Figure 12:
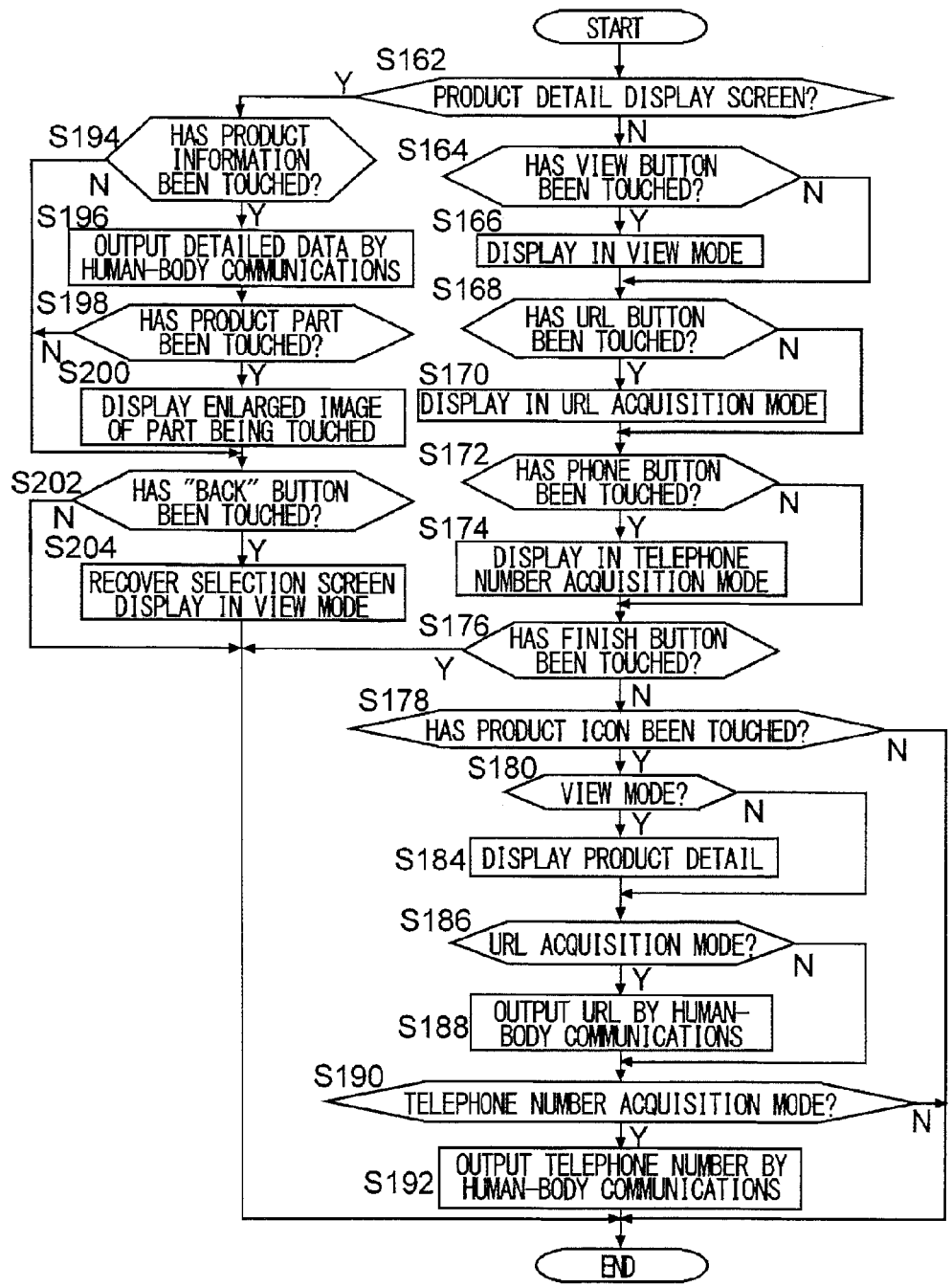
FIG. 12 A flowchart illustrating details of Step S146 of FIG. 11.

FIG. 12 is a flowchart illustrating details of the touch handling processing performed in Step S146 of FIG. 11. When the flow starts, it is verified in Step S162 whether or not the display surface 638 is in the display state of the product detail display screen as illustrated in FIG. 10(B). If not the product detail display screen, which means that the display surface 638 is in the product selection screen display state as illustrated in FIG. 10(A), the flow advances to Step S164 to verify whether or not the view button 612 has been touched. If the touch is detected, display indicating that a view mode has been set is performed in Step S166, and the flow advances to Step S168. On the other hand, if the touch on the view button 612 is not detected in Step S164, the flow advances directly to Step S168.

In Step S164, it is verified whether or not the URL button 615 has been touched. If the touch is detected, display indicating that the URL acquisition mode has been set is performed in Step S170, and the flow advances to Step S172. On the other hand, if the touch on the URL button 615 is not detected in Step S168, the flow advances directly to Step S172. In Step S172, it is verified whether or not the phone button 617 has been touched. If the touch is detected, display indicating that the telephone number acquisition mode has been set is performed in Step S174, and the flow advances to Step S176. On the other hand, if the touch on the phone button 617 is not detected in Step S172, the flow advances directly to Step S176.

In Step S176, it is verified whether or not the finish button 614 has been touched. If no finish button touch is detected, the flow advances to Step S178 to verify whether or not any one of the product icons 602 has been touched. If the touch on the product icon 602 is detected, the flow advances to Step S180 to verify whether or not the view mode is set. If the view mode is set, the flow advances to Step S184 to change the display from the product selection screen display of FIG. 10(A) to the product detail display screen of FIG. 10(B), and the flow advances to Step S186. On the other hand, if it is not detected in Step S180 that the view mode is set, the flow advances directly to Step S186.

In Step S186, it is verified whether or not the URL acquisition mode is set. If the URL acquisition mode is set, the flow advances to Step S188 to output data on the URL to the cellular telephone 4 by the human-body communication through the touching finger 608, and the flow advances to Step S190. On the other hand, if it is not detected in Step S186 that the URL acquisition mode is set, the flow advances directly to Step S190. In Step S190, it is verified whether or not the telephone number acquisition mode is set. If the telephone number acquisition mode is set, the flow advances to Step S192 to output data on the telephone number to the cellular telephone 4 by the human-body communication through the touching finger 608, and the flow is finished. On the other hand, if it is not detected in Step S190 that the URL acquisition mode is set, the flow is immediately finished. Further, if none of the touches on the product icons 602 is detected in Step S178, the flow is immediately finished as well.

On the other hand, if it is detected in Step S162 that the product detail display screen is being displayed on the display surface 638, the flow advances to Step S194, and it is verified in Step S194 whether or not a product information display portion has been touched on the product detail display screen. If the touch is detected, the flow advances to Step S196 to output detailed data of the product to the cellular telephone 4 by the human-body communication through the touching finger 608, and the flow advances to Step S198. In Step S198, it is verified whether or not the touched position is a part of the product itself. If so, the flow advances to Step S20 to overlap-display an image obtained by enlarging the part being touched, and the flow advances to Step S202. On the other hand, if it is not detected in Step S198 that the touched position is the part of the product, which means an information part has been touched, the flow advances directly to Step S202. In addition, if the touch on the product information display portion is not detected in Step S194, the flow advances directly to Step S202 as well.

In Step S202, it is verified whether or not the "back" button 611 has been touched on the product detail display screen, and if so, the flow advances to Step S204 to return the display from the product detail display screen of FIG. 10(B) to the product selection screen display of FIG. 10(A), and is finished. Note that, in Step S204, the product selection screen display is further set in the view mode. Note that, Step S176 of FIG. 12 is provided in order to quickly finish the touch handling processing when it is detected that the finish button 614 has been touched. In FIG. 11, the touch on the finish button 614 is further detected in Step S148 after the touch handling processing, but in this case, there is no problem in the flow even if the same thing is detected twice.

Figure 13:
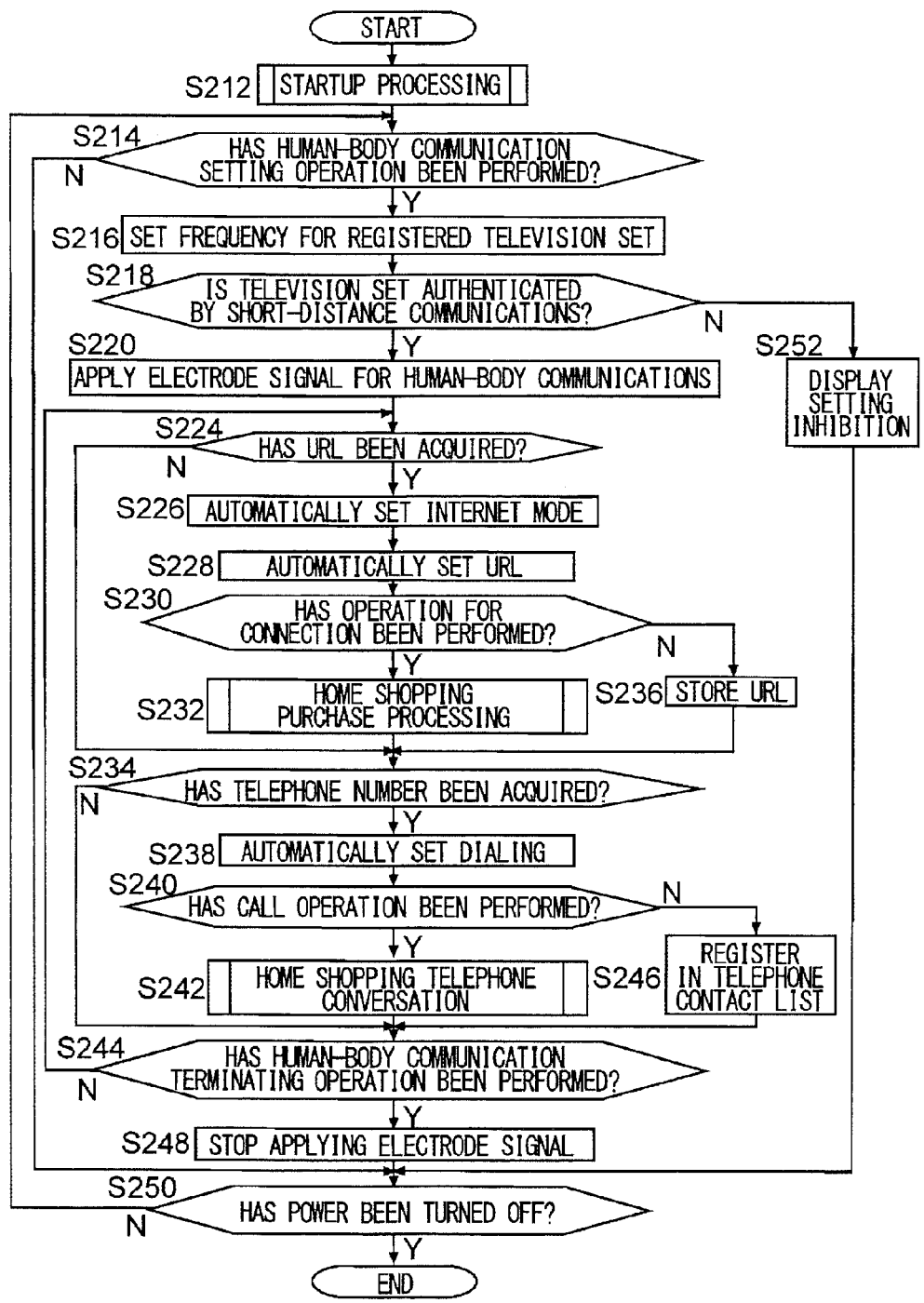
FIG. 13 A flowchart illustrating a function of a cellular telephone control unit according to the sixth embodiment.

FIG. 13 is a basic flow related to cooperation of the cellular telephone control unit 14 of the cellular telephone 4 with respect to the television set 12 according to the sixth embodiment. In FIG. 13, normal functions such as voice communication and mail which are originally provided to the cellular telephone 4 are omitted, and functions of a telephone conversation and the Internet are illustrated only in a case of relating to the cooperation with the television set 12. The flow is started by turning on the main switch and supplying power to the cellular telephone 4. When the flow starts, in Step S212, processing for starting up the cellular telephone 4 is performed. Subsequently, it is verified in Step S214 whether or not an operation for setting activation of the human-body communication function has been performed. If a human-body communication setting operation is not detected, the flow advances to Step S250, and if it is not detected here that the power has been turned off by the main switch, the flow returns to Step S214. Thus, Step S214 and Step S250 are repeated unless the human-body communication setting operation is not performed in Step S214, but once there is a normal operation for the cellular telephone 4 during that time, the flow related to the operation is executed. In FIG. 13, illustration and description of steps related thereto are omitted.

Here, if the human-body communication setting operation is detected in Step S214, the flow advances to Step S216 to perform setting of the frequency for human-body communication with respect to the registered television set 12. In addition, in Step S218, the authentication of the television set 12 is performed by the short-distance communication, and if the authentication is OK, in Step S220, the transmission/reception electrode 26 is applied with a signal for the human-body communication to enter the standby state for the human-body communication. Subsequently, it is verified in Step S224 whether or not the URL has been acquired by the human-body communication, and if the URL acquisition can be confirmed, the flow advances to Step S226 to automatically set the Internet mode. In addition, in Step S228, the acquired URL is automatically set as an access destination in preparation for a connection to the website for the home shopping. Note that, if the authentication of the television set 12 is NG in Step S218, the flow advances to Step S252 to display that a human-body communication setting is in an inhibited state, and the flow advances to Step S250. In this manner, an information provider is authenticated before the human-body communication so as to prevent malicious data from being captured onto the cellular telephone 4 due to incautious contact with the human body.

If the authentication of the television set 12 is OK in Step S218, and when the connection to the website for the home shopping becomes ready as described above by Step S228, it is verified in Step S230 whether or not an operation for a connection to the website has been performed within a predetermined time. If the operation for the connection is detected, the flow advances to Step S232 to perform the purchase processing for the product provided by the home shopping under the guidance on the website, and the flow advances to Step S234. On the other hand, if the operation for the connection is not detected within the predetermined time in Step S230, the flow advances to Step S236 to automatically store the URL, and the flow advances to Step S234. This allows the purchase processing to be performed at a later date after reexamination. Note that, if the acquisition of the URL is not detected in Step S224, the flow advances directly to Step S234.

In Step S234, it is verified whether or not the telephone number has been acquired by the human-body communication, and if the telephone number acquisition can be confirmed, the flow advances to Step S238 to automatically set dialing for the product purchase provided by the home shopping based on the acquired telephone number. Then, it is verified in Step S240 whether or not a call operation has been performed based on the set telephone number within a predetermined time, and if the call operation is performed, the flow advances to Step S242. In Step S242, a telephone conversation for the home shopping is performed, and the flow advances to Step S244. On the other hand, if the call operation is not detected within the predetermined time in Step S240, the flow advances to Step S246 to automatically store the telephone number in a telephone contact list on the cellular telephone 4, and the flow advances to Step S244. This allows the call for purchase to be made at a later date after reexamination. Note that, if the acquisition of the telephone number is not detected in Step S234, the flow advances directly to Step S244.

In Step S244, it is verified whether or not a human-body communication terminating operation has been performed. If the human-body communication terminating operation is detected, the flow advances to Step S248 to stop applying the signal for the human-body communication to the transmission/reception electrode 62, and the flow advances to Step S250. On the other hand, if the human-body communication terminating operation is not detected in Step S244, the flow returns to Step S224. After that, unless the human-body communication terminating operation is detected in Step S244, Step S224 to Step S244 are repeated to handle the information acquisition performed by the human-body communication.

Seventh Embodiment

A seventh embodiment is structured as a home shopping device that causes an on-street display device and the cellular telephone to cooperate. Note that, the on-street display device according to the seventh embodiment can be structured as, specifically, a large screen display device accompanied by a store window on a street, an electronic paper advertisement posted on the street, or the like. A structure thereof is common to the sixth embodiment except that the display device is changed from the television set to the on-street display device, and hence the description is made by incorporating FIG. 1 and FIG. 10. However, in understanding the seventh embodiment, the "music track data sales device" or the "sales device" with reference to FIG. 1 is assumed to be read as the "on-street display device" and the "music track data" is assumed to be read as the "product data". Further, also in the case of the seventh embodiment, the audio signal output unit 58 is not necessary for an on-street display device 12. Note that, on the on-street display device 12, it is assumed that display data on home shopping products is received by the short-distance communication unit 66 of FIG. 1 or appropriate wireless/wired communication means not shown in FIG. 1. Further, the on-street display device 12 is dedicated to the display of product information, which eliminates the need to provide the finish button 614 that is provided in order to return to the display as in the progress of the television program in FIG. 10(A).

In the seventh embodiment, the display surface 638 of the on-street display device 12 is applied with the transmission signal having the public frequency during time periods when people pass by except midnight, and is in the standby state for the human-body communication. Such control based on the time is performed by an on-street display device control unit 46 into which a clock function is built. On the other hand, the cellular telephone 4 is set to the same frequency by being set in the home shopping mode, and is in the human-body communication standby state. When both are in the standby mode, if the view button 612 is touched while menu icons are displayed on the display surface 638, in order to indicate that the current state is the "view" state, the view button 612 is brought into the display state of being surrounded by the thick frame as illustrated in FIG. 10(A). Hereinafter, the operation performed in the "view" state is the same as in the sixth embodiment, and hence description thereof is omitted. Further, the operation performed when the URL button 615 is touched and the operational performed when the phone button 617 is touched are also the same as in the sixth embodiment, and hence description thereof is omitted.

In the seventh embodiment, in the case where the on-street display device 12 is structured as the large screen display device accompanied by the store window, the products displayed on the display surface 638 are set to correspond to the products being actually exhibited in the store window, and the product icons 602 on the display surface 638 can be arranged by being assigned the same product numbers as those of the products in the store window or can be arranged in a layout corresponding to a showcase arrangement in the store window. On the other hand, in the case where the on-street display device 12 is structured as the electronic paper advertisement, a simpler structure is employed, and it is possible to eliminate a change of the image to the enlarged image or detailed description as illustrated in FIG. 10(B) and to include only the product icon 602 of FIG. 10(A) in the display. The function for this case is specialized for the acquisition of the URL or the telephone number performed by the human-body communication, and hence it is unnecessary to display not only the finish button 614 but also the view button 612. Further, the product icon 602 can be provided as an actual product photograph instead of a symbol, and in this case, it is possible to examine the purchase based on the larger product photograph displayed on the large screen of the electronic paper advertisement in comparison with the home shopping using only the display unit 15 of the cellular telephone 4. Note that, the URL or telephone number acquisition based on the touch on the electronic paper according to the seventh embodiment advertisement has a feature of being useful in eliminating time and labor to take note or make a manual input not only in the home shopping but also generally in cases of looking at the electronic paper advertisement to access the Web to acquire detailed information and make an inquiry by telephone.

Eighth Embodiment

Figure 14:
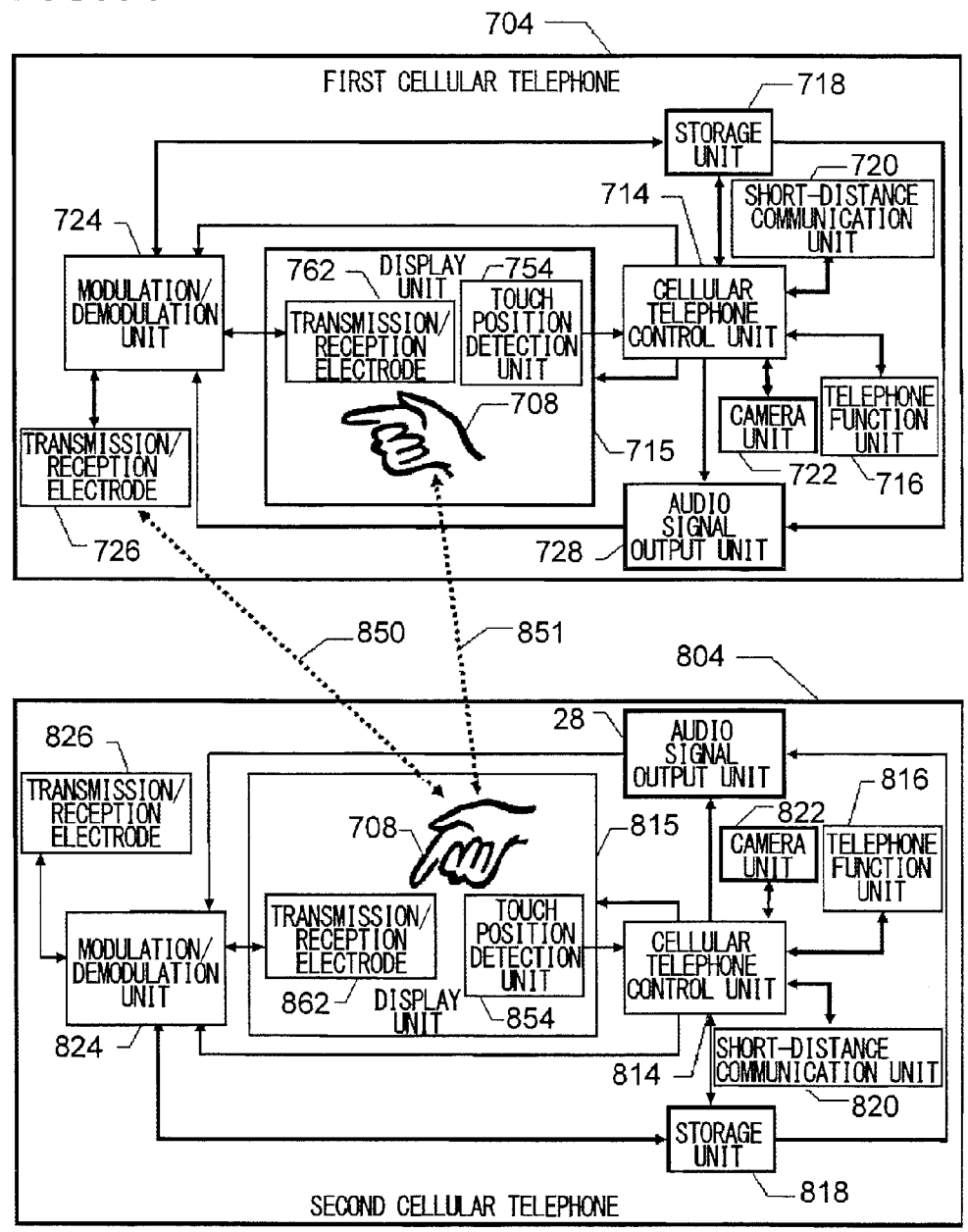
FIG. 14 A block diagram illustrating an eighth embodiment of the present invention. (eighth embodiment)

FIG. 14 is a block diagram illustrating an eighth embodiment of an information input/output device according to an embodiment of the present invention. The eighth embodiment is structured as a system including two cellular telephones 704 and 804. With such a system structure as described above, the eighth embodiment is structured so that, for example, by touching a predetermined part of a display unit 715 of a first cellular telephone 704 by the finger 708 of the user to designate data and then touching a predetermined part of a display unit 815 of a second cellular telephone 804 by the same finger 708 of the user, the designated date stored on the cellular telephone 704 is moved or copied to a predetermined directory on the cellular telephone 804 by the human-body communication utilizing the body of the user.

Most parts of the structures of the first cellular telephone 704 and the second cellular telephone 804 according to the eighth embodiment of FIG. 14 are common to the structure of the cellular telephone 4 according to the first embodiment of FIG. 1, and hence the parts corresponding thereto are denoted by reference numerals in the 700s and 800s with the same numbers in the tens and ones places. With regard to the parts that can be understood in the same manner as the first embodiment, the description of the first embodiment is incorporated to thereby omit the description of the eighth embodiment as long as there is no need therefor.

The display unit 715 of the first cellular telephone 704 is provided with a touch position detection unit 754, which is the same as that provided to the display surface 38 of the music track data sales device 12 of FIG. 1, and a transmission/reception electrode 762 for applying the signal for the human-body communication. Therefore, the display unit 715 serves as a touch panel, and enables the human-body communication through the finger 708 touching the touch panel. In this manner, the first cellular telephone 704 includes two transmission/reception electrodes, in other words, a transmission/reception electrode 726 provided in a position near the human body surface, such as an external wall or the like thereof, and the transmission/reception electrode 762 provided to a display surface 715, which are both under control of a modulation/demodulation unit 724. In the same manner, the second cellular telephone 804 includes a touch position detection unit 854 on a display surface 815. In addition, the second cellular telephone 804 includes two kinds of transmission/reception electrodes, in other words, a transmission/reception electrode 826 provided to an external wall or the like and a transmission/reception electrode 862 provided to the display surface 815, which are both under control of a modulation/demodulation unit 824.

As already described, in the eighth embodiment, it is possible to exchange data between the cellular telephones by making use of the display surface 715 and the display surface 815. As an example, to describe a case of transmitting the date stored on the first cellular telephone 704 to the second cellular telephone 804, an operation for displaying icons of a plurality of files or folders corresponding to data to be candidates on the display unit 715 is first performed prior to the data transmission. At this time, for example, the first cellular telephone 704 is assumed to be held by the left hand of the user. Then, the right finger 708 of the user is used to touch one of the plurality of icons displayed on the display unit 715. The touch position detection unit 754 detects the touch, which completes identification of the data to be transmitted, and the corresponding data is ready for the output from a storage unit 718.

On the other hand, on the second cellular telephone 804 side, display for designating a storage position for receiving the transmission data is performed by the display unit 815 to prepare for data reception. For example, the display unit 815 displays a plurality of folders at a predetermined level of a directory structure. In this state, a desired folder is touched by the same right finger 708 of the user. The touch position detection unit 854 detects the touch, which identifies the directory of a transmission destination. Then, by continuing the touch, the designated data is output from the transmission/reception electrode 726 to the left hand of the user holding the first cellular telephone 704. As indicated by an arrow 850, the data is transmitted to the right finger 708 of the user touching the display unit 815 through the human body of the user, and is stored in a storage unit 818 from the transmission/reception electrode 862. The storage position at this time corresponds to the icon being touched by the right finger 708 of the user which has been detected by the touch position detection unit 854. In the above-mentioned manner, according to the eighth embodiment, the data is input to the position touched on the touch panel by the human-body communication through the touching finger 708.

Note that, when the data is output from the modulation/demodulation unit 724 to the transmission/reception electrode 726 after completion of the identification of the data to be transmitted on the first cellular telephone 704, the same signal is also output to the transmission/reception electrode 762 of the display unit 715. Accordingly, when such a one-hand operation as to hold the first cellular telephone 704 by the right hand and touch the icon on the display unit 715 by the finger 708 thereof is performed, and while continuing the operation, when the display unit 815 of the second cellular telephone 804 is touched by the left finger (the right hand 708 is illustrated in FIG. 14, which is assumed in this case to be read as the left hand for an understanding), the data transmission from the first cellular telephone 704 to the second cellular telephone 804 is made possible, as indicated by an arrow 851, by the human-body communication from the right hand of the user to the left hand thereof.

Figure 15A:
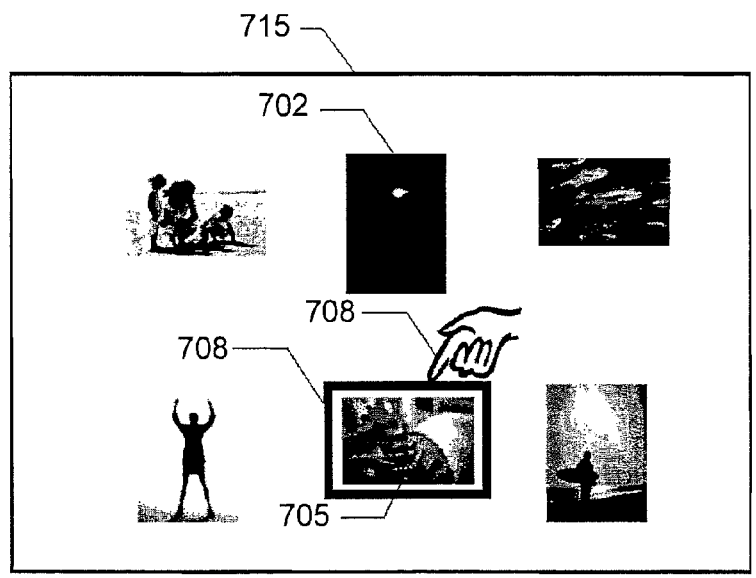
FIG. 15 Display screen diagrams illustrating display of a display unit according to the eighth embodiment of the present invention.
Figure 15B:
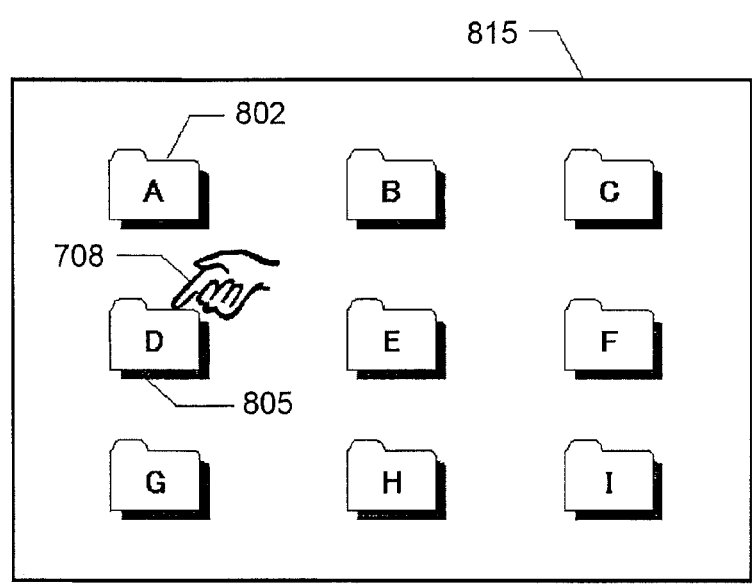

FIG. 15 are display screen diagrams illustrating the display of a display unit of the cellular telephone according to the eighth embodiment, in which FIG. 15(A) indicates the display unit 715 of the first cellular telephone 704 and FIG. 15(B) indicates the display unit 815 of the second cellular telephone 804. Further, FIG. 15 illustrate a case of performing the data transmission from the first cellular telephone 704 to the second cellular telephone 804 as an example. On the display unit 715 of the first cellular telephone 704 illustrated in FIG. 15(A), a plurality of image icons 702 obtained when the data to be transmitted is photographed images are displayed as an example. When the finger 708 is used to touch an image icon 705 being one of those, a selection cursor 708 is displayed around the image icon 705, which indicates that the image icon 705 is in a selected state.

The selected state is kept stored until an operation for canceling the selection is performed or the data transmission is completed, and hence the operation state is maintained even if the finger 708 is released.

On the other hand, on the display unit 815 of the second cellular telephone 804 illustrated in FIG. 15(B), a plurality of folder icons 802 to be candidates that store the transmission data are displayed as an example. When the finger 708 is used to touch the folder icon 802 being one of those, and if the touch is continued, the image data corresponding to the image icon 705 is transmitted to a directory position corresponding to a folder icon 805 by the human-body communication through the finger 708. In the above-mentioned manner, when the transmission is completed, the selection cursor 708 disappears from the icon illustrated in FIG. 15(A) to cancel the selection of the icon.

Figure 16:
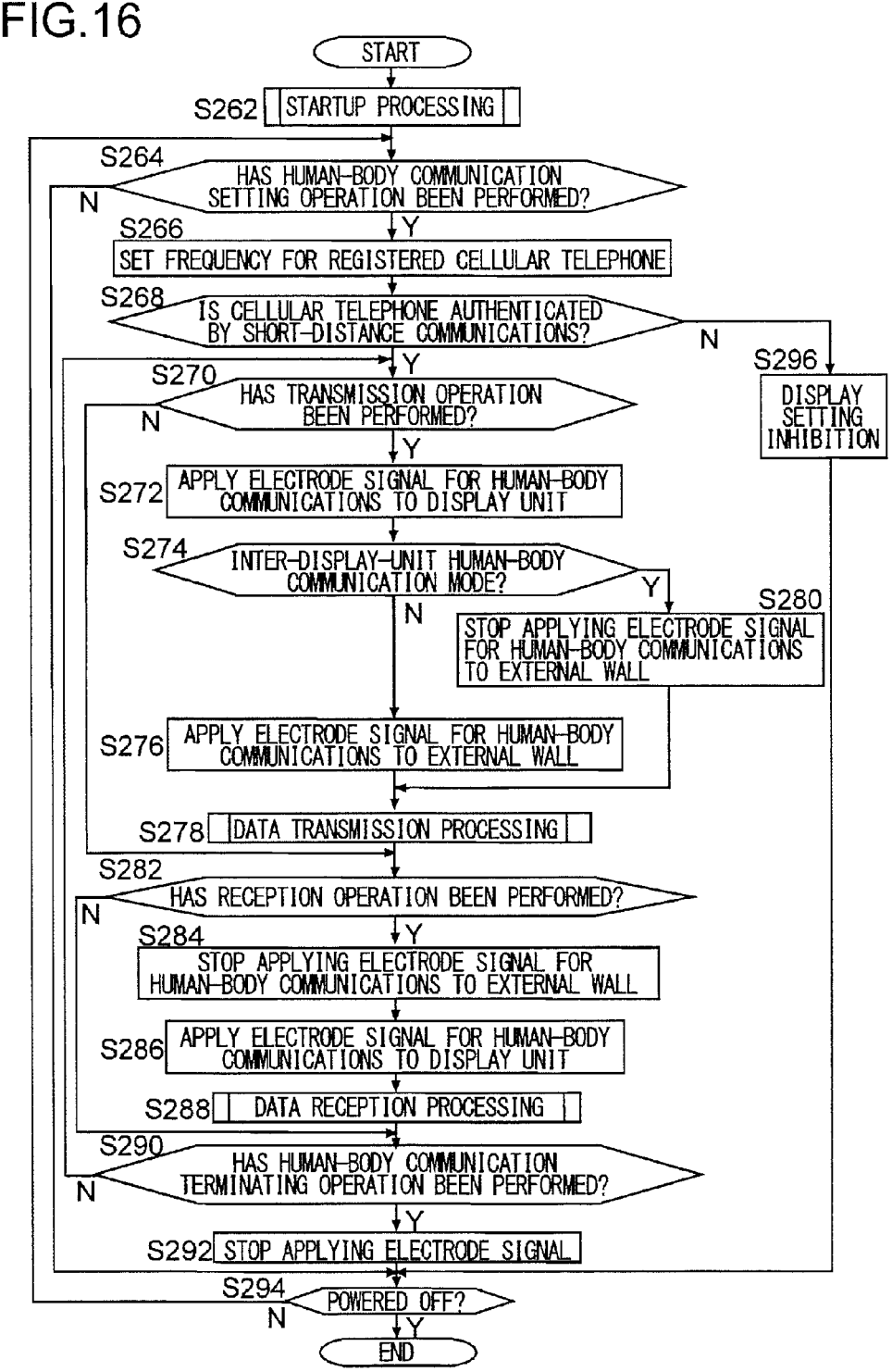
FIG. 16 A flowchart illustrating a function of a cellular telephone control unit according to the eighth embodiment.

FIG. 16 is a basic flow related to information transmission performed by a cellular telephone control unit 714 of the first cellular telephone 704 according to the eighth embodiment of FIG. 14 with respect to the second cellular telephone 804. Note that, the flow of FIG. 16 can be applied to a cellular telephone control unit 814 of the second cellular telephone 804 in completely the same manner. In the same manner as in the case of FIG. 13, in FIG. 16, the normal functions such as voice communication and mail which are originally provided to the cellular telephone are omitted, and only a case related to information transmission performed by the human-body communication between the cellular telephones is illustrated. The flow is started by turning on the main switch and supplying power to the cellular telephone 704. When the flow starts, in Step S262, processing for starting up the cellular telephone 704 is performed. Subsequently, it is verified in Step S264 whether or not the operation for setting activation of the human-body communication function has been performed. If the human-body communication setting operation is not detected, the flow advances to Step S294, and if it is not detected here that the power has been turned off by the main switch, the flow returns to Step S264. Thus, Step S264 and Step S294 are repeated unless the human-body communication setting operation is not performed in Step S264, but once there is a normal operation for the cellular telephone 704, another operation related to the first embodiment to the seventh embodiment, or the like during that time, the flow related to the operation is executed. In the same manner as in FIG. 13, also in FIG. 16, illustration and description of steps related thereto are omitted.

Here, if the human-body communication setting operation is detected in Step S264, the flow advances to Step S266 to perform setting of the frequency for human-body communication with respect to registered another cellular telephone (for example, the second cellular telephone 804). In addition, in Step S268, the authentication of the other cellular telephone is performed by the short-distance communication, and if the authentication is OK, the flow advances to Step S270. Note that, if the authentication of the cellular telephone of the party is NG in Step S268, the flow advances to Step S296 to display that a human-body communication setting is in an inhibited state, and the flow advances to Step S294. In this manner, the party is authenticated before the human-body communication so as to prevent information from being leaked from the cellular telephone 704 to an unexpected party or being received from a malicious party due to incautious contact with the human body.

In Step S270, it is verified whether or not the setting operation detected in Step S264 has been an operation for selecting the information transmission to the other cellular telephone. If a transmission operation is detected in Step S270, the flow advances to Step S272 to apply the signal for the human-body communication to the transmission/reception electrode 762 of the display unit 715, and the flow advances to Step S274. In Step S274, it is verified whether or not the transmission operation set in Step S270 has been in the human-body communication mode limited to between the display units. An inter-display-unit human-body communication mode allows information to be exchanged only in a case where both the cellular telephones on an information transmission side and an information reception side are connected by a human-body communication path in real time, which is one of security countermeasures for preventing information from being leaked to an unexpected party or being received from a malicious party.

If it is not detected in Step S274 that the inter-display-unit human-body communication mode is enabled, the flow advances to Step S276 to apply the signal for the human-body communication also to the transmission/reception electrode 726 provided to the external wall, and the flow advances to Step S278. Thus, unless the inter-display-unit human-body communication mode is enabled, the human-body communication is made possible in a contact state with any one of the external wall of the cellular telephone 704 and the display unit 715, which increases a degree of freedom in holding the cellular telephone 704. On the other hand, if it is detected in Step S274 that the inter-display-unit human-body communication mode is enabled, the flow advances to Step S280 to inhibit the signal from being applied to the transmission/reception electrode 726 provided to the external wall, and the flow advances to Step S278. In Step S278, data transmission processing with respect to the cellular telephone of the party is performed, and the flow advances to Step S282. Details of the data transmission processing are described later. On the other hand, if the transmission operation is not detected in Step S270, the flow advances directly to Step S282.

In Step S282, it is verified whether or not the setting operation detected in Step S264 has been an operation for selecting the information reception from the other cellular telephone. If a reception operation is detected in Step S282, the flow advances to Step S284 to inhibit the signal from being applied to the transmission/reception electrode 726 provided to the external wall. This limits the reception of data to the case of the touch on the display surface 715, which is one of the security countermeasures for preventing information from being received from a malicious party. Subsequently, in Step S286, the signal for the human-body communication is applied to the transmission/reception electrode 762 of the display unit 715, and the flow advances to Step S288.

In Step S288, data reception processing from the cellular telephone of the party is performed, and the flow advances to Step S290. Details of the data reception processing are described later. On the other hand, if the reception operation is not detected in Step S282, the flow advances directly to Step S290. In Step S290, it is verified whether or not the human-body communication terminating operation has been performed. If the human-body communication terminating operation is detected, the flow advances to Step S292 to stop applying the signal for the human-body communication to all the transmission/reception electrodes 726 and 762, and the flow advances to Step S294. On the other hand, if the human-body communication terminating operation is not detected in Step S290, the flow returns to Step S270. After that, unless the human-body communication terminating operation is detected in Step S290, Step S270 to Step S290 are repeated to handle the information transmission operation or information reception operation performed by the human-body communication.

Figure 17:
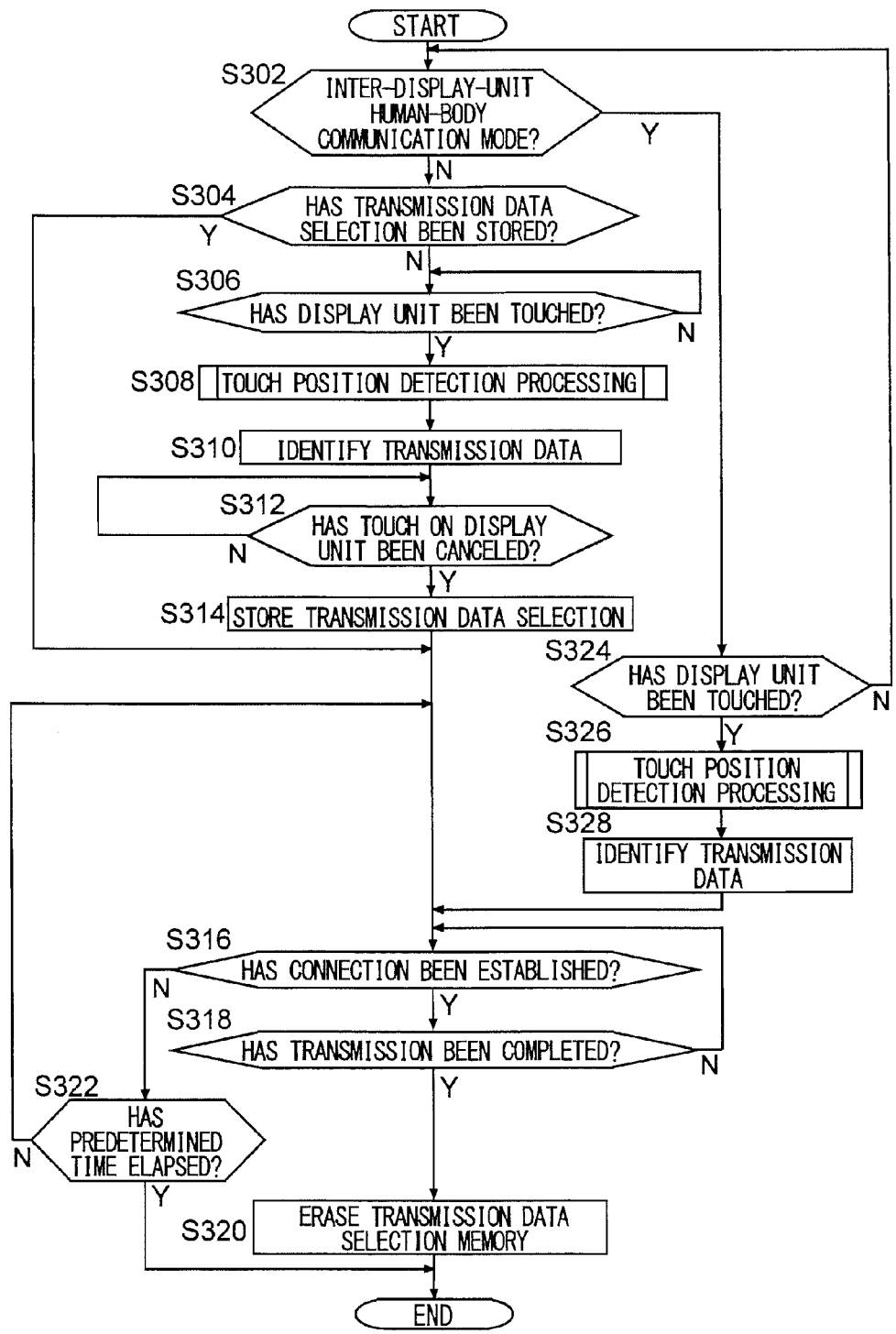
FIG. 17 A flowchart illustrating details of Step S278 of FIG. 16.

FIG. 17 is a flowchart illustrating details of the data transmission processing performed in Step S278 of FIG. 16. When the flow starts, it is verified in Step S302 whether or not the inter-display-unit human-body communication mode is enabled. If not, which means that the human-body communication from the transmission/reception electrode 726 provided to the external wall is possible, the flow advances to Step S304 to verify whether or not the data to be transmitted has been stored in the selection memory. If the data to be transmitted is not selected, the flow advances to Step S306 to verify whether or not the display unit 715 has been touched for the data selection. If there is no touch, Step S306 is repeated to wait for the touch.

If the touch on the display unit 715 is detected in Step S306, the touch position detection processing is performed in Step S308, the data to be transmitted is identified based on the result in Step S310. Subsequently, it is verified in Step S312 whether or not the finger 708 is temporarily released from the display unit 715. If the touch is continued, Step S312 is repeated to wait until the touch is canceled. If it is detected in Step S312 that the touch on the display unit is canceled, the flow advances to Step S314 to store the selection of the data to be transmitted, and the flow advances to Step S316. Note that, if it is detected in Step S304 that the data to be transmitted has already been selected and stored, the flow advances directly to Step S316.

In Step S316, it is verified whether or not the connection of the human-body communication has been established by touching the display unit 815 of the second cellular telephone 804 by the finger 708 of the user holding the first cellular telephone 704. If the connection is established, it is verified in Step S318 whether or not the transmission of the data has been completed, and if completed, the flow advances to Step S320 to erase the selection memory of the corresponding transmission data, and is finished. On the other hand, if transmission completion cannot be detected in Step S318, the flow returns to Step S316 to repeat Step S316 and Step S318 to wait for the transmission completion as long as the connection is established.

On the other hand, if connection establishment is not detected in Step S316, the flow advances to Step S322 to verify whether or not a predetermined time has elapsed since the transmission operation is detected in Step S270 of FIG. 16. If a lapse of the predetermined time is detected, the flow is immediately finished. At this time, the selection memory of the transmission data is not erased, and therefore can be utilized when the transmission operation is retried. On the other hand, if the lapse of the predetermined time is not detected in Step S322, the flow returns to Step S316. After that, unless the transmission completion or the lapse of the predetermined time is detected, Step S316 to Step S322 are repeated to continue the transmission of the data.

Further, if the inter-display-unit human-body communication mode is detected in Step S302, the flow advances to Step S324 to verify whether or not the display unit 715 has been touched. If the touch is not detected, the flow returns to Step S302 to repeat Step S302 and Step S324 until the touch is detected. If the touch is detected in Step S324, the flow advances to Step S324 to perform the touch position detection processing. Then, the transmission data is identified based on a touch position detection result, and the flow advances to Step S316. At this time, the selection memory of the transmission data is not stored, and hence the data transmission is no longer performed if the touch is canceled and if the connection establishment is no longer detected in Step S316. In this manner, in the inter-display-unit human-body communication mode, the data transmission is performed only while the identification of the transmission data and the identification of a reception position are established in real time by simultaneously having the display units touched on both a transmission side and a reception side. Specifically, the transmission is possible only by such an operation that the display unit 715 (or 815) on the transmission side is touched by a finger of one hand and the display unit 815 (or 715) on the reception side is touched by a finger of the other hand at the same time.

Figure 18:
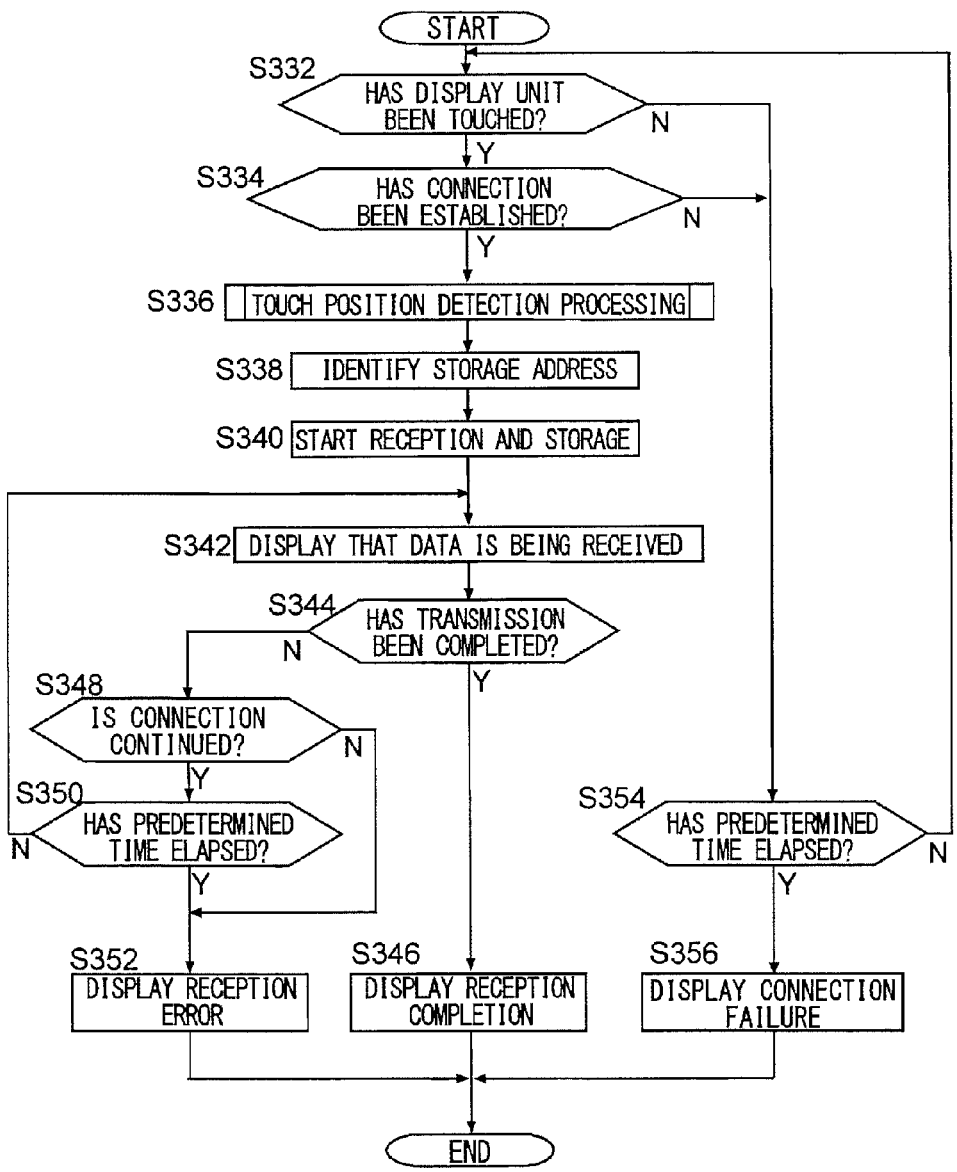
FIG. 18 A flowchart illustrating details of Step S288 of FIG. 16.

FIG. 18 is a flowchart illustrating details of the data reception processing performed in Step S288 of FIG. 16. Note that, the description has been made so far by taking FIG. 16 as the flow of the first cellular telephone 704, and the data reception processing of Step S288 is a function for receiving data. Therefore, for the sake of convenience, in accordance with the fact that the second cellular telephone 804 is described as the cellular telephone on a data reception side in FIG. 14 and FIG. 15, the description is made with reference to FIG. 14 and FIG. 15 by assuming that FIG. 18 illustrates a function of the second cellular telephone 804. However, this is only for the sake of conformity of the description, and it is natural that the first cellular telephone 704 and the second cellular telephone 804 have completely the same structure and functions. In other words, both have the functions of the data transmission and the data reception that are illustrated in FIG. 16 to FIG. 18, and it is arbitrarily determined which is on a data transmission side and which is on the data reception side.

In FIG. 18, when the flow starts, it is verified in Step S332 whether or not the display unit 815 of the second cellular telephone 804 has been touched. If there is a touch, the flow advances to Step S334 to verify whether or not the same user is also in contact with the first cellular telephone 704 and the connection for the human-body communication has been established. If the establishment of the connection is detected, the flow advances to Step S336 to perform the touch position detection processing by using the touch position detection unit 854. Subsequently, in Step S338, an address of the storage unit 818 that stores reception data is identified based on the touch position detection result, the reception and storage of the data are started in Step S340, and the flow advances to Step S342.

In Step S342, display indicating that the data is being received is performed by the display unit 815, and the flow advances to Step S344 to verify whether or not the data transmission has been completed. If the transmission completion is detected, the display of data reception completion is performed by the display unit 815 in Step S346, and the flow is finished. On the other hand, if the transmission completion is not detected in Step S344, the flow advances to Step S348 to verify whether or not the connection of the human-body communication is continued. If continuation of the connection is detected, the flow advances to Step S350 to verify whether or not a predetermined time has elapsed since the reception operation is detected in Step S282 of FIG. 16. If the lapse of the predetermined time is not detected, the flow returns to Step S342. After that, unless the transmission completion is detected, unless the continuation of the connection is no longer detected, or unless the lapse of the predetermined time is detected, Step S344, Step S348, and Step S350 are repeated to continue the transmission of the data.

In contrast thereto, if the lapse of the predetermined time is detected in Step S350 or if the continuation of the connection is no longer detected in Step S348, the flow advances to Step S352 to perform display of an data reception error by the display unit 815, and is finished. Further, if the touch on the display unit 815 is not detected in Step S332, the flow advances to Step S354 to verify whether or not the predetermined time has elapsed since the reception operation is detected in Step S282 of FIG. 16. If the lapse of the predetermined time is not detected, the flow returns to Step S332. After that, unless the lapse of the predetermined time is detected, Step S332 and Step S354 are repeated to wait for the touch on the display unit 815. On the other hand, if the lapse of the predetermined time is detected in Step S354, the flow advances to Step S356 to perform display of a connection failure by the display unit 815, and is finished.

Note that, in the eighth embodiment, FIG. 15 illustrates a display example in the case where the image data corresponding to the image icon 705 being displayed on a display screen 715 of the first cellular telephone 704 is stored in the storage position within the directory corresponding to the folder icon 805 being displayed on a display screen 815 of the second cellular telephone 804, but the display on an image reception side is not limited to such a case as illustrated FIG. 15. For example, if the display screen 815 of the second cellular telephone 804 is set in a state in which an image icon is displayed, it is possible to perform such display that the image icon of the display screen 715 is copied and pasted or cut and pasted on the display screen 815. In this manner, according to the features of the present invention, it is possible to perform a GUI operation by using the touch panel for the information transmission with a feeling as if the display screen 715 and the display screen 815 were a single screen as a whole.

The above-mentioned implementations of the features of the present invention are not limited to the above-mentioned embodiments, and advantages thereof can be enjoyed in various implementations. For example, the features of the above-mentioned eighth embodiment is not limited to the information transmission performed between the cellular telephones, and can be implemented in data transmission performed between monitor screens of a plurality of personal computers. In this case, the transmission/reception electrode 726 provided to the external wall of the cellular telephone 704 can be provided to a mouse connected to the personal computer. With this structure, it is possible to transmit data from a first personal computer to a second personal computer by touching the monitor screen of the first personal computer and the monitor screen of the second personal computer in order by the left finger while holding the mouse of the first personal computer by the right hand. Alternatively, the data transmission can be performed between the personal computers also by touching the monitor screen of the first personal computer by the right finger and touching the monitor screen of the second personal computer by the left finger at the same time.

In addition, in the features of the eighth embodiment, the identification of the data to be transmitted is not necessarily limited to the identification performed on the touch panel of a device on the data transmission side, and can be performed also by operating a cursor on a normal display screen by using the mouse. Accordingly, even the data identified by various means can be input to a desired position within the device on the reception side through the finger touching the touch panel of the device on the data reception side.

Further, the various functions described for the cellular telephone according to the above-mentioned respective embodiments may not necessarily be implemented for the separate cellular telephones, and all the functions illustrated in FIG. 1 to FIG. 18 or a plurality of functions appropriately selected therefrom may arbitrarily be implemented by being mounted to a single cellular telephone.

Hereinafter, generalized description is made of the technical features described above.

(First Technical Feature)

A first technical feature disclosed in the present description relates to an information input/output device, and an object thereof for solving conventional problems is to provide an information input device and an information output device which are more user-friendly.

In order to achieve the above-mentioned object, the first technical feature disclosed in the present description provides an input/output device including: a detection unit that detects a touch position on a display screen as input information; an output information providing unit that provides output information based on detection performed by the detection unit; and an information output unit that applies the output information provided by the output information providing unit to the display screen for the human-body communication. Therefore, the output information based on the input information can be output through the human body that is touching in order to input information.

According to a specific feature, a storage unit that stores information based on a detection result obtained by the detection unit is further included. Therefore, the detection result can be retained even if the detection of the touch performed by the detection unit is discontinued. According to a further specific feature, the output information providing unit provides the output information based on the information stored in the storage unit. Therefore, even if the touch is discontinued, the output information based on the input information can be output by touching again.

According to another specific feature, the information output unit modulates the output information provided by the information providing unit into a predetermined human-body communication frequency and outputs the resultant. Therefore, the output information can be output without a mix-up through the human body that is touching in order to input information. According to a further specific feature, the information output unit is allowed to change the predetermined human-body communication frequency. Therefore, it is possible to suitably output different output information items.

According to another feature, there is provided an input/output device including: a detection unit that detects a touch position on the display screen as input information; an output information providing unit that provides output information; and an information output unit that applies the output information provided by the output information providing unit to the display screen for the human-body communication in response to touch position detection performed by the detection unit. Therefore, only by touching the display screen in order to input information, the output information can be output through the touching human body.

According to a specific feature, the information output unit stops applying the output information when the touch position detection is no longer continued by the detection unit. Therefore, it is possible to avoid the meaningless information output from being continued when the touch is abandoned on purpose because of the information output becoming unnecessary.

According to another feature, there is provided an input/output device including: a biometric authentication unit for inputting authentication information from the human body; an output information providing unit that provides output information; and an information output unit that applies the output information provided by the output information providing unit to the biometric authentication unit for the human-body communication. Therefore, the output information can be output by the human-body communication through the human body being subjected to the biometric authentication.

According to another feature, there is provided an input/output device including: a biometric authentication unit for inputting authentication information from the human body; a receiving unit that receives human-body communication information applied to the human-body communication unit when an authentication is performed by the biometric authentication unit; and a judgement unit that judges whether or not to output information based on an authentication result obtained from the biometric authentication unit and the human-body communication information obtained from the detection unit. Therefore, information necessary for the judgement based on the authentication can be acquired by the human-body communication through the human body being subjected to the biometric authentication.

According to another feature, there is provided an input/output device including: a detection unit that detects a touch on the display screen as input information; an information output unit that applies the output information provided by the output information providing unit to the display screen for the human-body communication; and a confirmation unit that confirms whether or not touch detection has been continued by the detection unit during the information output performed by the information output unit. Therefore, it is possible to ensure the information output through the touch the display screen made in order to input information. Note that, according to a specific feature, if no confirmation is obtained by the confirmation unit, the information output unit repeats applying the output information to the display screen.

According to another feature, there is provided an input/output device including: a touch unit that can be touched for the human-body communication; an information input unit that detects input information applied to the touch unit through the human-body communication; an information output unit that applies the output information related to the input information to the touch unit for the human-body communication; and a control unit that performs an authentication of the input information and output management for the output information in the human-body communication between the information input unit and the information output unit. Therefore, it is possible to ensure information exchange performed by the human-body communication.

The various features as described above are useful for the purchase of the music track data, event admission ticket data, the image data, the electronic passenger ticket data, and the like, the exchange of the image data, an electronic transaction using the automatic teller machine at a banking facility, and the like.

As described above, according to the first technical feature disclosed in the present description, there is provided an input/output device suitable for human-body communication.

(Second Technical Feature)

A second technical feature disclosed in the present description relates to a mobile device and an information displaying device, and an object thereof for solving conventional problems is to provide a mobile device and an information displaying device which are more user-friendly.

In order to achieve the above-mentioned object, the second technical feature disclosed in the present description provides an mobile device including: communication means; a storage unit that stores communication destination determination information for determining a communication destination used by the communication means; and human-body communication means for inputting the communication destination determination information. Therefore, the communication destination determination information can be acquired only by trying human-body contact with communication destination information source, which facilitates the communication performed by the communication means. A specific example of the communication means is the Internet, and the communication destination determination information is a uniform resource locator (URL). Another specific example of the communication means is the telephone line, and the communication destination determination information is the telephone number.

A specific example of the communication destination is a home shopping product provider. In this case, for example, the URL or the telephone number can be acquired only by trying human-body contact with a product introducing media screen of a television set, a catalog, or the like, which allows the purchase procedure for the home shopping product to be easily followed.

According to a specific feature, the mobile device is provided with authentication means for performing an authentication of a communication destination determination information source being in contact for the human-body communication. Therefore, there is no human-body communication performed with the information provider that cannot be authenticated, which prevents a malicious information break-in made by a touch on an unintended item.

According to another specific feature, a communication frequency that allows the human-body communication to be performed with the television set serving as the determination information source is set for the human-body communication means. Therefore, by a touch on a television screen, it is possible to easily acquire the communication destination determination information necessary for access to the related communication destination.

According to another specific feature, a communication frequency that allows the human-body communication to be performed with the on-street display device serving as the communication destination determination information source is set for the human-body communication means. Therefore, by a touch on a street advertisement screen, it is possible to easily acquire the communication destination determination information necessary for access to the related communication destination.

According to another feature, there is provided an information displaying apparatus including: a display screen; a receiving unit that receives display information to be displayed on the display screen; a human-body communication unit; and a control unit that controls the human-body communication unit in accordance with the display information received by the receiving unit. Therefore, it is possible to prevent incautious human-body communication, and it is possible to automatically enable the human-body communication based on the display information as necessary. According to a more specific feature, the control unit controls whether or not the human-body communication can be performed by the human-body communication unit in accordance with the received display information. According to a further specific feature, the control unit enables the human-body communication performed by the human-body communication unit when the received display information is a still image.

According to another feature, there is provided an information displaying apparatus including: a display screen; a receiving unit that receives display information to be displayed on the display screen; a storage unit that stores the display information; a human-body communication unit; and a control unit that enables the human-body communication performed by the human-body communication unit when the display information stored in the storage unit is reproduced on the display screen. Therefore, the human-body communication is possible under the display based on the stored display information without temporal restrictions. According to a more specific feature, the control unit stops the human-body communication performed by the human-body communication unit when the reproduction of the display information stored in the storage unit is stopped.

According to another feature, there is provided an information displaying apparatus including: a display screen; a receiving unit that receives display information to be displayed on the display screen; a detection unit that detects a touch positioned on the display screen; and a control unit that controls the detection unit in accordance with the display information received by the receiving unit. Therefore, it is possible to prevent unnecessary touch position detection and automatically enable the touch position detection based on the display information as necessary. According to a more specific feature, the control unit controls whether or not the touch position detection can be performed by the detection unit in accordance with the received display information. According to a further specific feature, the control unit enables the touch position detection performed by the detection unit when the received display information is a still image.

According to another specific feature, the information displaying apparatus is provided with the storage unit that stores the display information, and the control unit enables the touch position detection performed by the detection unit when the display information stored in the storage unit is reproduced on the display screen. Therefore, the touch position detection is possible under the display based on the stored display information without temporal restrictions. According to a more specific feature, the control unit stops the touch position detection performed by the detection unit when the reproduction of the display information stored in the storage unit is stopped.

According to another feature, there is provided an information displaying apparatus including: a display screen; a human-body communication unit that performs the human-body communication through the contact with the display screen; a timer unit; and a control unit that controls the human-body communication unit in accordance with a time measured by the timer unit. Further, according to another feature of the present invention, there is provided an information displaying apparatus including: a display screen; a detection unit that detects a touch position on the display screen; a timer unit; and a control unit that controls the detection unit in accordance with a time measured by the timer unit. By those features, it is possible to prevent the human-body communication or the touch position detection during unreasonable time periods and avoid a malicious information break-in or a mix-up. Those features are useful particularly in a case where the information displaying apparatus is implemented as an on-street display screen.

As described above, according to the second technical feature disclosed in the present description, there is provided a mobile device or an information displaying device including a practical human-body communication function and a touch panel.

(Third Technical Feature)

A third technical feature disclosed in the present description relates to an information input device and an information output device, and an object thereof for solving conventional problems is to provide an information input device and an information output device which are more user-friendly.

In order to achieve the above-mentioned object, the third technical feature disclosed in the present description provides an information input device including: a display screen; a detection unit that detects a touch position on the display screen; a storage unit including a plurality of information storage positions; a human-body communication unit provided to the display screen; and a control unit that inputs information to be transmitted to the information storage position within the storage unit designated based on detection performed by the detection unit via the human-body communication unit.

According to the above-mentioned features, the transmitted information can be input to the storage position through the human body touching the display screen in order to designate the information storage position. In other words, the touch on the display screen serves as double functions of designating the information storage position and securing an information transmission path.

According to a specific feature, the control unit inputs information in response to the touch position detection performed by the detection unit. Therefore, by a single operation of touching the display screen, it is possible to designate the information storage position, secure the information transmission path, and start the information transmission.

According to another specific feature, the control unit causes an input state of the information to be displayed on the display unit. Therefore, it is possible to continue the touch while viewing the display as necessary and positively secure the information transmission path. Examples of such display include display indicating that the information is being input, display of the completion of the information input, and display of an error in the information input.

According to another specific feature, the control unit can apply the output information to the human-body communication unit in order to transmit the information stored in the storage unit to the external portion. Therefore, the human-body communication unit is also used for inputting/outputting information. According to a further specific feature, the information input device includes a second human-body communication unit provided in a part other than the display surface, and the control unit can apply the output information to the second human-body communication unit in order to transmit the information stored in the storage unit to the external portion. Therefore, the information can be transmitted through the second human-body communication unit even in the case where the display surface is not touched. According to a more specific feature, the control unit inhibits the function of the second human-body communication unit when the information transmitted via the human-body communication unit provided to the display screen is input to the information storage position within the storage unit designated based on the detection performed by the detection unit. Therefore, it is possible to prevent malicious information and the like from being input carelessly from the second human-body communication unit.

According to another feature, there is provided an information output device including: a first human-body communication unit; a second human-body communication unit provided in a place different from the first human-body communication unit; a storage unit; and a control unit that applies at least one of the first human-body communication unit and the second human-body communication unit with output information for transmitting information stored in the storage unit to an external portion. This increases a degree of freedom in performing the human-body communication.

According to a specific feature, the control unit can input the information transmitted via the first human-body communication unit in the storage unit. Therefore, the human-body communication unit is also used for inputting/outputting information. According to a more specific feature, the control unit inhibits the function of the second human-body communication unit when the information transmitted via the first human-body communication unit is input to the storage unit. Therefore, it is possible to prevent malicious information and the like from being carelessly input from the second human-body communication unit. According to another more specific feature, the information output device includes a display screen, and the first human-body communication unit is provided to the display screen.

According to another feature, there is provided an information output device including: a display screen; a detection unit that detects a touch position on the display screen; a storage unit that stores a plurality of information items that are selectable; a human-body communication unit; and a control unit that retains selection memory obtained by selecting at least one of the plurality of information items stored in the storage unit based on detection performed by the detection unit, and applies the human-body communication unit with output information for transmitting information selected based on the selection memory from the storage unit to an external portion. Therefore, the selection memory is retained even if the finger touching in order to select the output information is released from the display screen, which increases a degree of freedom in operation. For example, it is also possible to touch an information transmission destination of the external portion by the same finger for the human-body communication.

According to a specific feature, the control unit erases the selection memory upon completion of information transmission to the external portion performed by the human-body communication unit. Therefore, the selection memory can be retained according to the needs, which can prevent information transmission subjects from being mixed up. According to another specific feature, the human-body communication unit can be provided to the display screen. According to still another specific feature, the human-body communication unit can be provided to a portion other than the display screen.

According to a specific feature, the human-body communication unit includes a first human-body communication unit provided to the display screen and a second human-body communication unit provided to a portion other than the display screen, and the control unit can apply the first human-body communication unit with output information for transmitting information obtained by selecting at least one of the plurality of information items stored in the storage unit based on detection performed by the detection unit to an external portion. Therefore, it is possible to perform real-time information output based on the touch on the display screen. According to a more specific feature, the control unit inhibits the function of the second human-body communication unit when the output information is applied to the first human-body communication unit based on the detection performed by the detection unit. Therefore, when the human-body communication is performed in real time, it is possible to prevent malicious information and the like from being carelessly input from the second human-body communication unit.

As described above, according to the third technical feature disclosed in the present description, there is provided an information input device or an information output device capable of easily performing information transmission by making use of a human-body communication function.

INDUSTRIAL APPLICABILITY

The technical features disclosed in the present description can be utilized by the mobile device such as the cellular telephone and various devices including the display unit such as a personal computer.

Further, the technical features disclosed in the present description can be utilized as means for acquiring a URL or a telephone number which is provided to the mobile device such as the cellular telephone, for information exchange with a product display device such as the television set or the on-street display device by the human-body communication, and for other such purposes.

Further, according to the technical features disclosed in the present description, there is provided an input/output device of a touch panel system which is useful for the purchase of the music track data, event admission ticket data, the image data, the electronic passenger ticket data, and the like, the exchange of the image data, the electronic transaction using the automatic teller machine at a banking facility, and like.

REFERENCE SIGNS LIST

38, 238, 338, 438, 538 display surface
54 detection unit
56, 58 output information providing unit
60, 62 information output unit
55 storage unit
522, 538 biometric authentication unit
60, 62 receiving unit
46 judgment unit
46 confirmation unit
38, 238, 338, 438, 538 touch unit
16 communication means
18 storage unit
24, 26 human-body communication unit
14 authentication means
14 control unit
38 display screen
66 receiving unit
60, 62 human-body communication unit
46 control unit
54 detection unit
55 storage unit
46 timer unit
715, 815 display screen
754, 854 detection unit
718, 818 storage unit
724, 762, 824, 862 human-body communication unit (first human-body communication unit)
714, 814 control unit
724, 726, 824, 826 second human-body communication unit

The invention claimed is:
1. An information input device for inputting information coming from outside into the device, comprising:

a storage unit having a plurality of destinations for input information received from outside the device, the input information from outside being able to be selectively input to any one of the plurality of destinations, wherein the input information from outside exists prior to an identification of one of the plurality of destinations to which the input information from outside is to be inputted;

a display screen of the device to which the input information from outside is inputted, the display screen displaying a plurality of display positions each of which corresponds to a respective one of the plurality of destinations for input information in the storage unit;

a receiving unit that receives display information to be displayed on the display screen to control the data input;

a detection unit that detects, in response to a touch of a human-body on the display screen, an occurrence of the touch and also detects, in response to the same touch on the screen, a position of the same touch on the display screen on which the display information is displayed, the position of touch being detected among the plurality of the display positions each of which corresponds to a respective one of the plurality of destinations for input information in the storage unit;

a control unit that controls the detection unit in accordance with the display information received by the receiving unit;

an identifying unit that identifies one of the plurality of destinations for the input information in the storage unit in accordance with the detection unit's detecting of the position of the touch on the display screen among the plurality of the display positions; and a transmission unit that selectively transmits the input information, received from outside the device, to the identified destination in the storage unit in response to the detection unit's detecting of the occurrence of the same touch of the human-body as the touch whose position is detected by the detection unit.

2. The information input device according to claim 1, wherein the input information is any one of:
music track and music track data;
event admission ticket data;
image data;
passenger ticket data;
transaction settlement result data obtained from the banking facility; and
home shopping product information.

3. The information input device according to claim 1 wherein the information input device is a mobile device.

4. The information input device according to claim 3, wherein the input information is at least one of:
a uniform resource locator (URL); or
a telephone number.

5. The information input device according to claim 1, wherein the control unit controls whether or not touch position detection by the detection unit is possible depending on the received display information.

6. The information input device according to claim 1, further comprising a timer unit, wherein the transmission unit is arranged to transmit the input information depending on a time measured by the timer unit.

7. An information input device for inputting information coming from outside into the device, the information input device comprising:
a storage unit having a plurality of information storage positions, the information from outside being able to be selectively input to any one of the plurality of information storage positions, wherein the information from outside exists prior to an identification of one of the plurality of information storage positions to which the information from outside is to be inputted;

a display screen of the device to which the information from outside is inputted, the display screen displaying a plurality of display positions each of which corresponds to a respective one of the plurality of information storage positions;

a detection unit that detects, in response to a touch of a human-body on the display screen, an occurrence of the touch and also detects, in response to the same touch on the screen, a position of the same touch on the display screen among the plurality of the display positions each of which corresponds to a respective one of the plurality of information storage positions;

a control unit that identifies one of the plurality of information storage positions within the storage unit based on the detection unit's detecting of the position of the touch on the display screen from among the plurality of the display positions; and a transmission unit that selectively transmits the information, received from outside the device, to the identified one of the information storage positions within the storage unit in response to the detection unit's detecting of the occurrence of the same touch of the human-body as the touch whose position is detected by the detection unit.

* * * * *